US009507967B2

(12) United States Patent
Wurster

(10) Patent No.: US 9,507,967 B2
(45) Date of Patent: *Nov. 29, 2016

(54) THWARTING ATTACKS THAT INVOLVE ANALYZING HARDWARE SENSOR OUTPUT

(75) Inventor: Glenn Daniel Wurster, Kitchener (CA)

(73) Assignee: BLACKBERRY LIMITED, Waterloo (CA)

( * ) Notice: Subject to any disclaimer, the term of this patent is extended or adjusted under 35 U.S.C. 154(b) by 415 days.

This patent is subject to a terminal disclaimer.

(21) Appl. No.: 13/396,871

(22) Filed: Feb. 15, 2012

(65) Prior Publication Data

US 2013/0212677 A1    Aug. 15, 2013

(51) Int. Cl.
| | |
|---|---|
| G06F 11/00 | (2006.01) |
| G06F 12/14 | (2006.01) |
| G06F 12/16 | (2006.01) |
| G06F 7/04 | (2006.01) |
| G06F 17/30 | (2006.01) |
| G08B 23/00 | (2006.01) |
| H04N 7/16 | (2011.01) |
| G06F 21/83 | (2013.01) |
| G06F 21/75 | (2013.01) |

(52) U.S. Cl.
CPC .............. *G06F 21/83* (2013.01); *G06F 21/75* (2013.01)

(58) Field of Classification Search
CPC ........ G06F 21/83; G06F 21/82; G06F 21/70; G06F 21/52; G06F 21/50; G06F 21/55; G06F 21/552; G06F 21/556; G06F 2221/031; G06F 21/75; G06F 9/468
USPC .................. 726/22–30, 17, 21; 713/193–194
See application file for complete search history.

(56) References Cited

U.S. PATENT DOCUMENTS

| 8,214,910 B1 * | 7/2012 | Gossweiler et al. ............ 726/26 |
| 8,351,773 B2 | 1/2013 | Nasiri et al. |
| 2009/0225026 A1 | 9/2009 | Sheba |
| 2009/0284482 A1 | 11/2009 | Chin |

(Continued)

FOREIGN PATENT DOCUMENTS

CN    101984640    3/2011

OTHER PUBLICATIONS

Schlegel et al., Soundcomber: A Stealthy and Context-Aware Sound Trojan for Smartphones, 2011.*

(Continued)

*Primary Examiner* — David Garcia Cervetti
*Assistant Examiner* — Trong Nguyen
(74) *Attorney, Agent, or Firm* — Integral Intellectual Property Inc.; Miriam Paton; Amy Scouten

(57) ABSTRACT

A hardware sensor and a hardware user-input component are integrated in a portable electronic device. The hardware sensor is operable to produce hardware sensor output indicative of orientation or motion or both of the device within its environment. The hardware user-input component has multiple elements operable to accept user input through touch. A user-input driver and the device's operating system are jointly operable to detect touch events involving the elements. A software application stored in the device's memory is executable by the device's processor as a process. A sensor driver or the operating system or both are configured to control what hardware sensor output, if any, is receivable by the process. This control may thwart an attack based on analysis of the hardware sensor output, the attack designed to deduce what user input has been made via multiple elements of the hardware user-input component.

32 Claims, 12 Drawing Sheets

(56) References Cited

U.S. PATENT DOCUMENTS

| | | | |
|---|---|---|---|
| 2009/0320143 A1* | 12/2009 | Gear et al. | 726/29 |
| 2011/0072441 A1* | 3/2011 | Parks et al. | 719/313 |
| 2012/0084833 A1* | 4/2012 | Thomas et al. | 726/3 |
| 2012/0280917 A1 | 11/2012 | Toksvig et al. | |

OTHER PUBLICATIONS

Liang et al., TouchLogger: Inferring Keystrokes on Touch Screen From Smartphone Motion, 2011.*

Liang et al., Defending Against Sensor-Sniffing Attacks on Mobile Phones, 2009.*

Cai, Liang et al., TouchLogger: Inferrig Keystrokes on Touch Screen From Smartphone Motion, XP55028349, Abstract, Sections 1, 2, 5, 7 and references Aug. 9, 2011.

Cai, Liang et al., Defending Against Sensor-Sniffing Attacks on Mobile Phones, XP55028339, pp. 31-36, Aug. 21, 2009.

Schlegel, Roman et al., Soundcomber: a Stealthy and Context-Aware Sound Trojan for Smartphones, XP55028571, pp. 17-33, Feb. 9, 2011.

Volpato, Gian Luca, Extended European Search Report for EP 12155664.1, Jun. 18, 2012.

Xu, Zhi et al., TapLogger: Inferring User Inputs on Smartphone Touchscreens Using On-board Motion Sensors WiSec'12, Apr. 16-18, 2012.

Owusu, Emmanuel et al., "ACCessory: Password Interference using Accelerometers on Smartphones", HotMobile'12, Feb. 28-29, 2012.

"SlideIT Keyboard—Product—What is SlideIT", 2011.

Asonov, Dmitri et al., "Keyboard Acoustic Emanations" Proceedings of the 2004 IEEE Symposium on Security and Privacy, pp. 3-11 May 2004.

Bao, Ling et al., "Activity Recognition from User-Annotated Acceleration Data" Pervasive 2004, LNCS 3001, pp. 1-17 2004.

Cai, Liang et al., "Defending Against Sensor-Sniffing Attacks on Mobile Phones" MobiHeld'09 Aug. 17, 2009.

Cai, Liang et al., "TouchLogger: Inferring Keystrokes on Touch Screen From Smartphone Motion" Proceedings of HotSec '11 Aug. 2011.

Kocher, Paul C., "Timing Attacks on Implementations of Diffie-Hellman, RSA, DSS, and Other Systems" CRYPTO, pp. 104-113 1996.

Kumar, Manu et al., "Reducing Shoulder-surfing by Using Gaze-based Password Entry" Symposium on Usable Privacy and Security (SOUPS) 2007 Jul. 18-20, 2007.

Ravi, Nishkam et al., "Activity Recognition from Accelerometer Data" American Association for Artificial Intelligence 2005.

Shah, Gaurav et al., "Keyboards and Covert Channels" Security '06: 15th USENIX Security Symposium 2006.

Song, Dawn X. et al., "Timing Analysis of Keystrokes and Timing Attacks on SSH" Proceedings of the 10th USENIX Security Symposium Aug. 13-17, 2001.

Anderson, Michael D., First Office Action for U.S. Appl. No. 13/396,879, Mar. 13, 2013.

Anderson, Michael D., Notice of Allowance for U.S. Appl. No. 13/396,879, Sep. 20, 2013.

Owusu, Emmanuel et al., ACCessory: Password Inference using Accelerometers on Smartphones, HotMobile'12, Feb. 28-29, 2012.

Schlegel, Roman, "Soundcomber: A Stealthy and Context-Aware Sound Trojan for Smartphones", Proceedings of the 18th Annual Network & Distributed System Security Symposium (NDSS '11), Feb. 6, 2011.

Volpato, Gian Luca, First Exam Report for EP 12155670.8, Feb. 6, 2013.

Volpato, Gian Luca, Extended European Search Report for EP 12155670.8, Jul. 25, 2012.

Volpato, Gian Luca, Second Exam Report for EP 12155664.1, Feb. 22, 2013.

Savin, Daniela, First Office Action for CA2806081, Nov. 13, 2014.

Volpato, Second Examination Report for EP 12155670.8, Nov. 11, 2014.

Winnik, First Office Action for CA2804608, Apr. 8, 2015.

Zhang, First Office Action for CN201310050771.7, May 5, 2015.

Savin, Second Office Action for CA2,806,081, mailed Nov. 9, 2015.

* cited by examiner

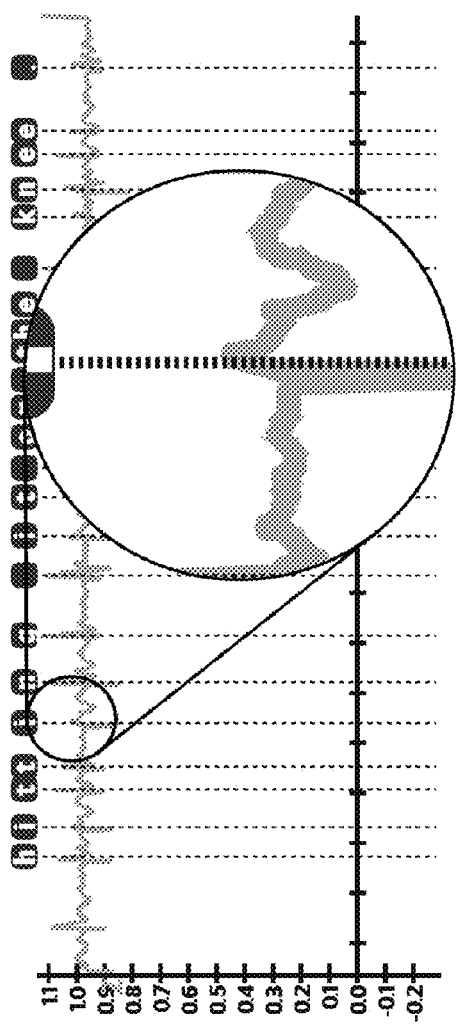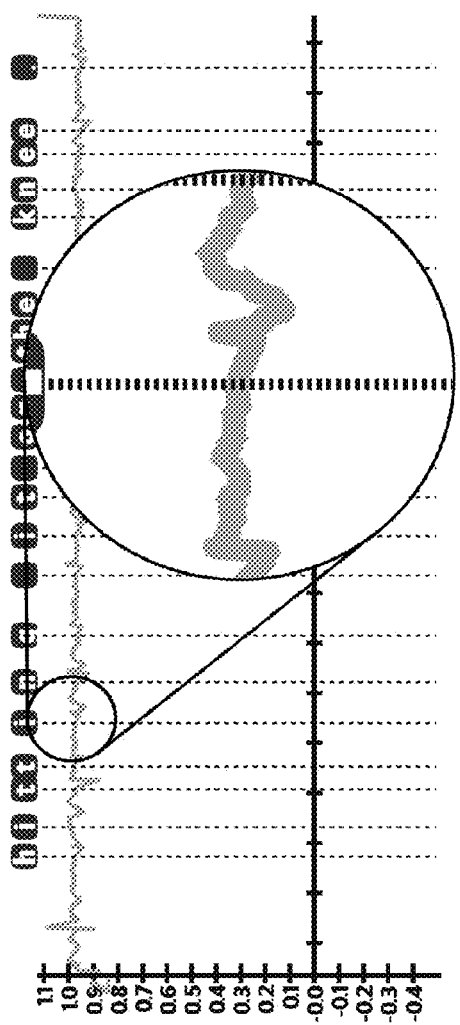

THWARTING ATTACKS THAT INVOLVE ANALYZING HARDWARE SENSOR OUTPUT

BACKGROUND

A portable electronic device may include one or more hardware sensors, each operable to produce hardware sensor output that is indicative of the orientation of the device within its environment, or that is indicative of motion of the device within its environment, or that is indicative of both the orientation and motion of the device within its environment. Traditionally, access to output from these hardware sensors has not been restricted.

BRIEF DESCRIPTION OF THE DRAWINGS AND APPENDICES

Embodiments are illustrated by way of example and not limitation in the figures of the accompanying drawings, in which like reference numerals indicate corresponding, analogous or similar elements, and in which.

Figure 1:
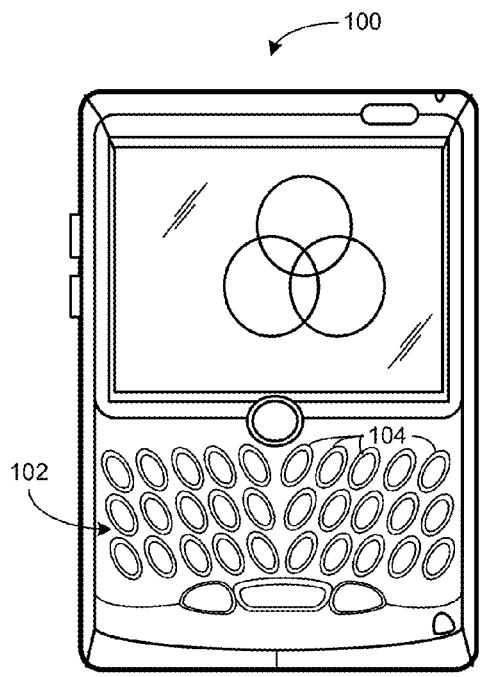
FIG. 1 is an illustration of an example portable electronic device and of an example physical tactile keyboard having multiple keys integrated in the device.
Figure 2:
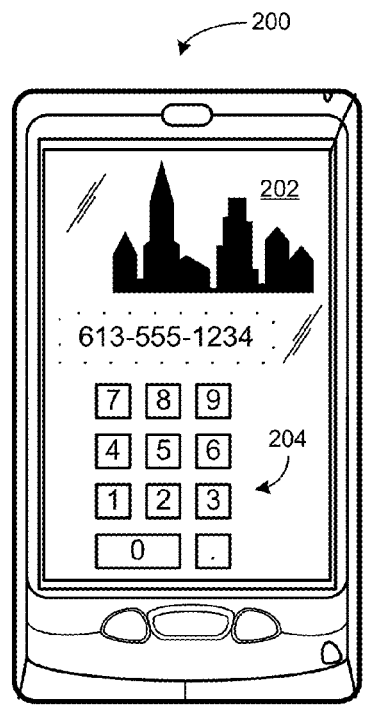
FIG. 2 is an illustration of an example portable electronic device and of an example touchscreen integrated in the device.
Figures 1, 4:
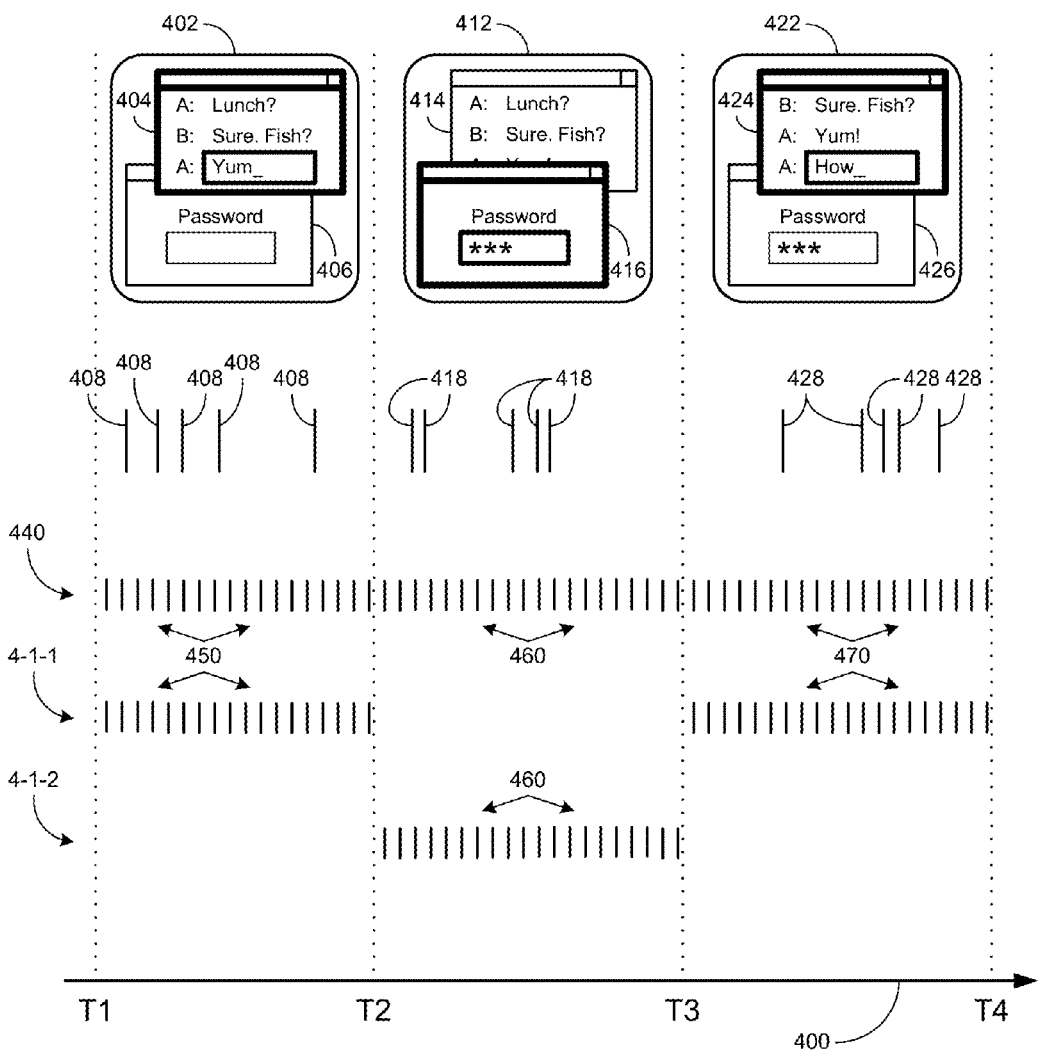
Figures 2, 4:
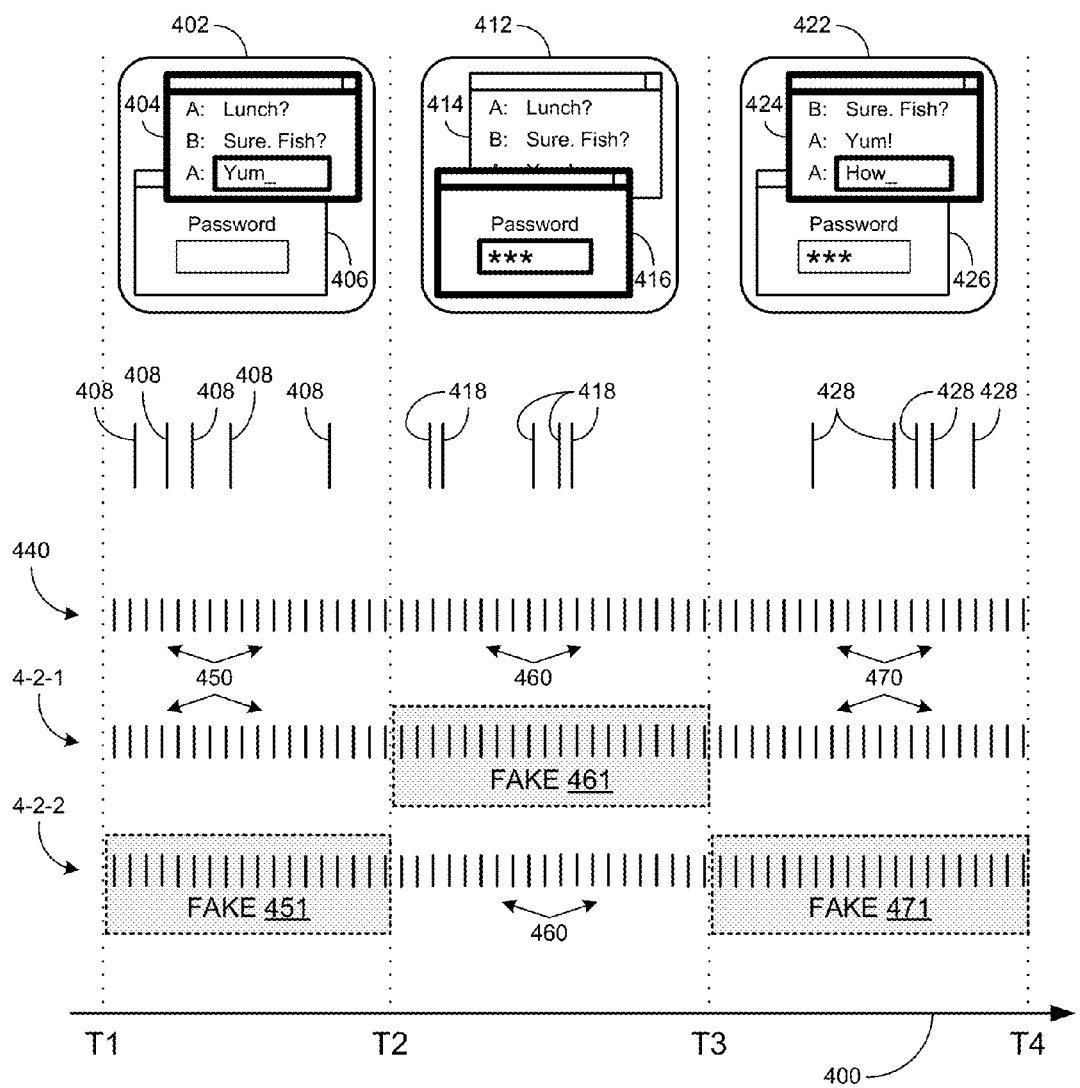
Figures 3, 4:
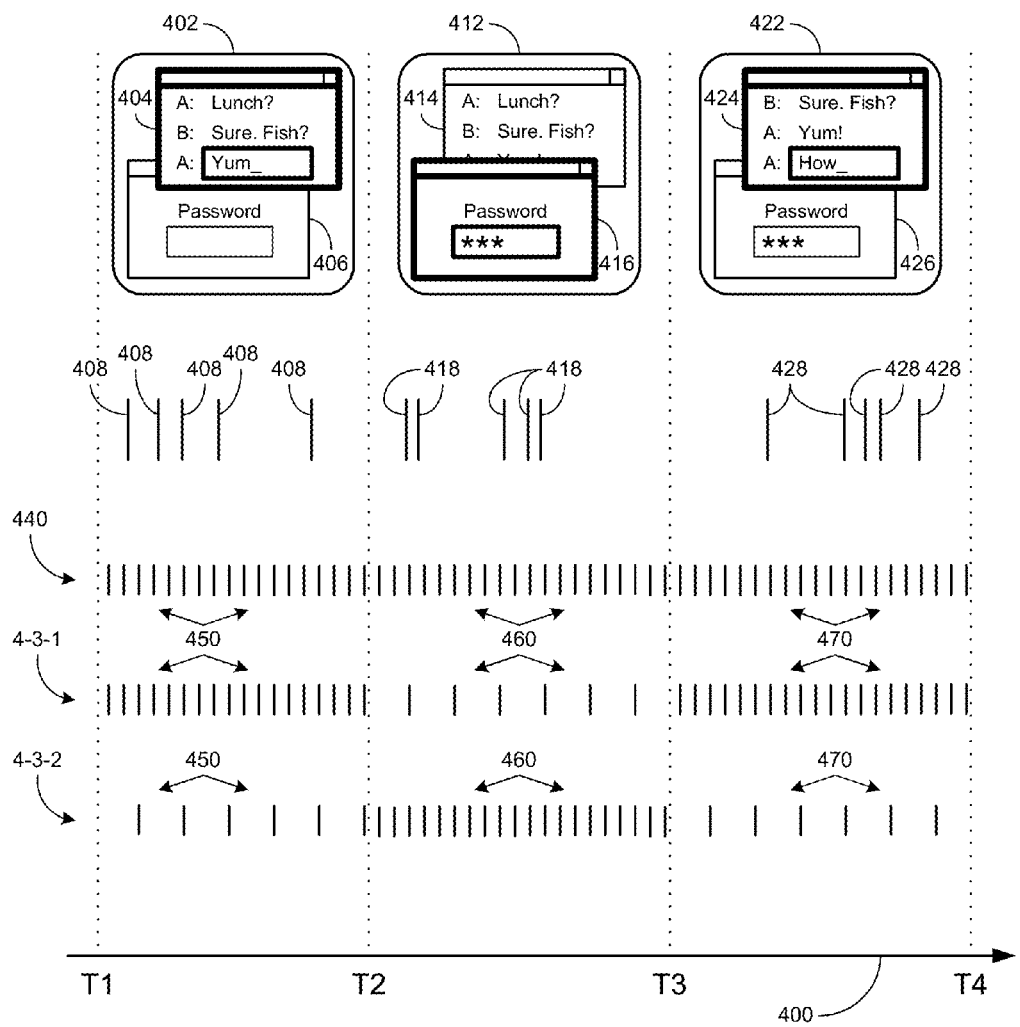
Figure 4:
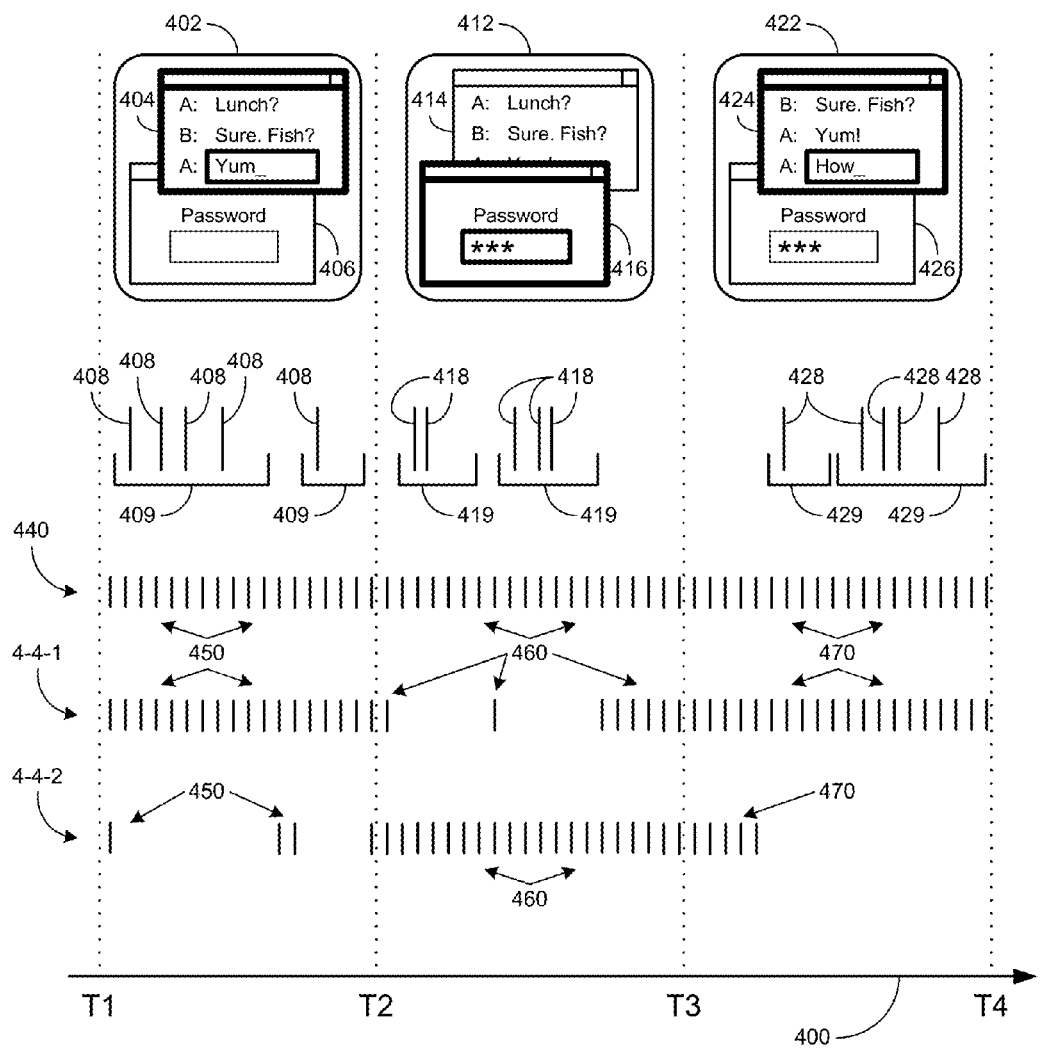
Figures 4, 5:
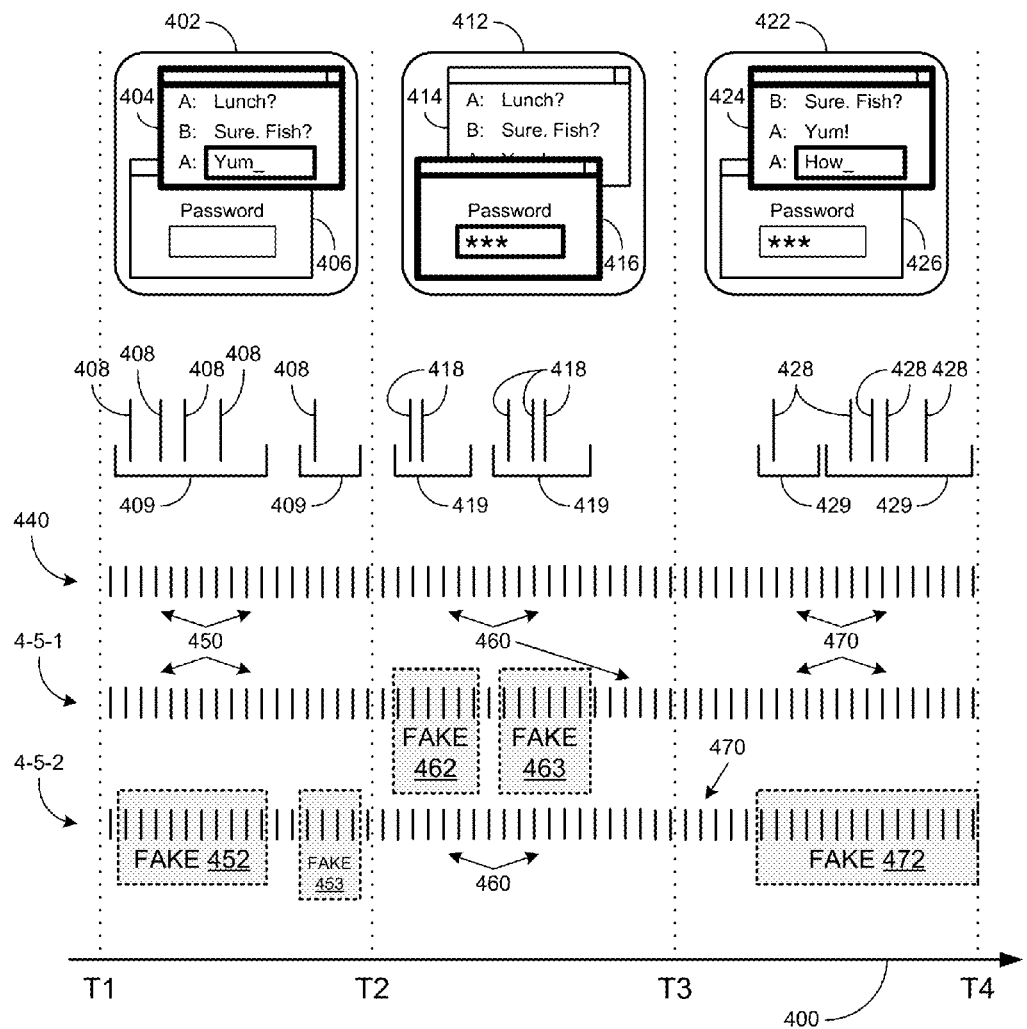
Figures 4, 5, 6:
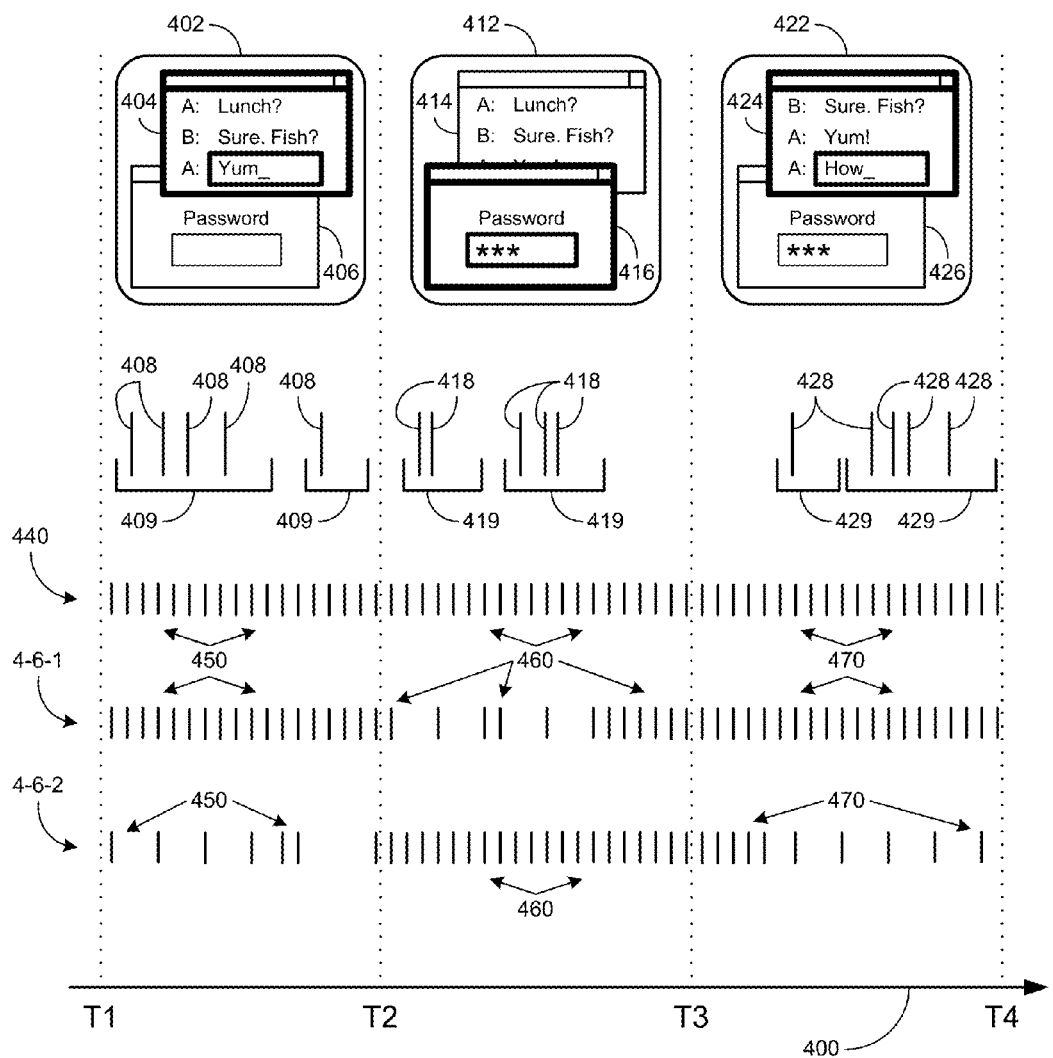
Figure 5:
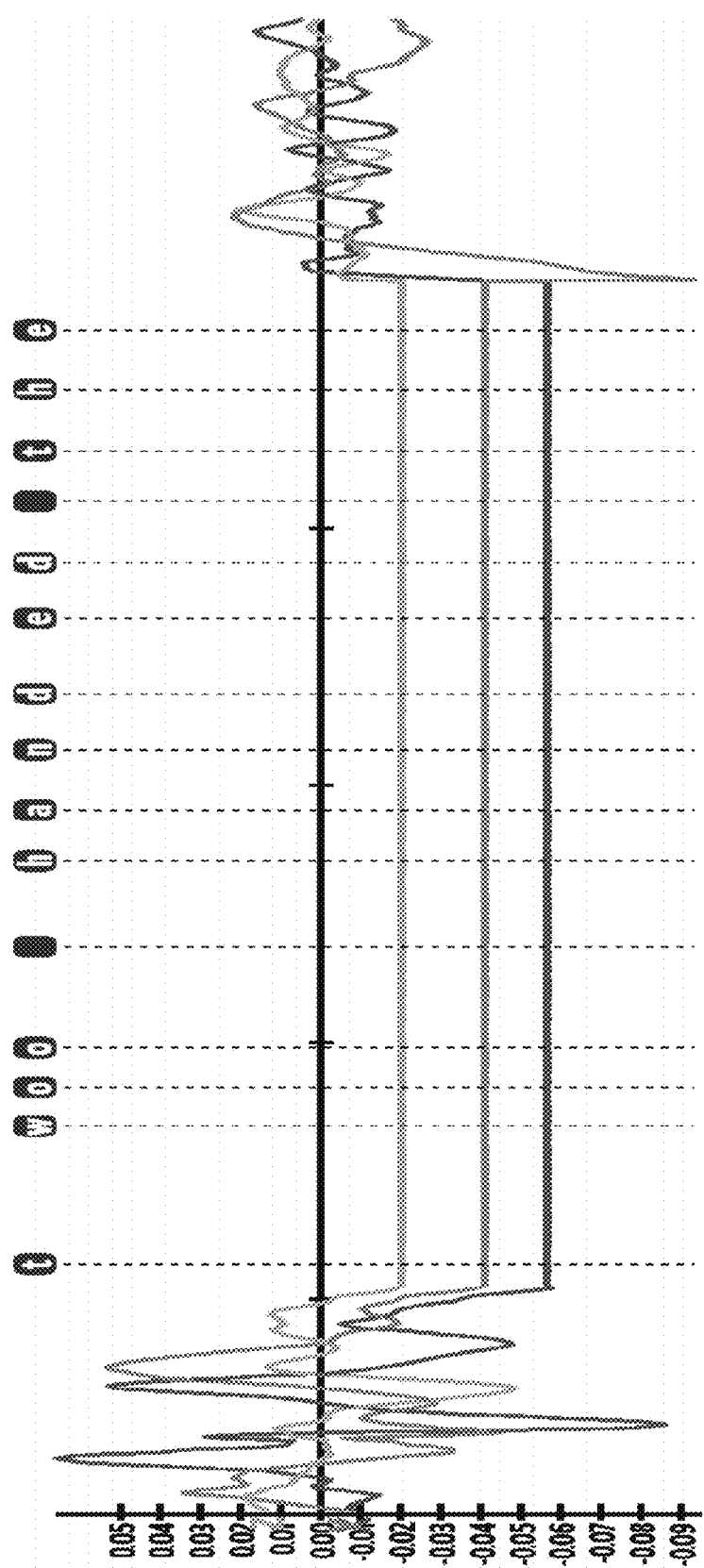
Figure 6:
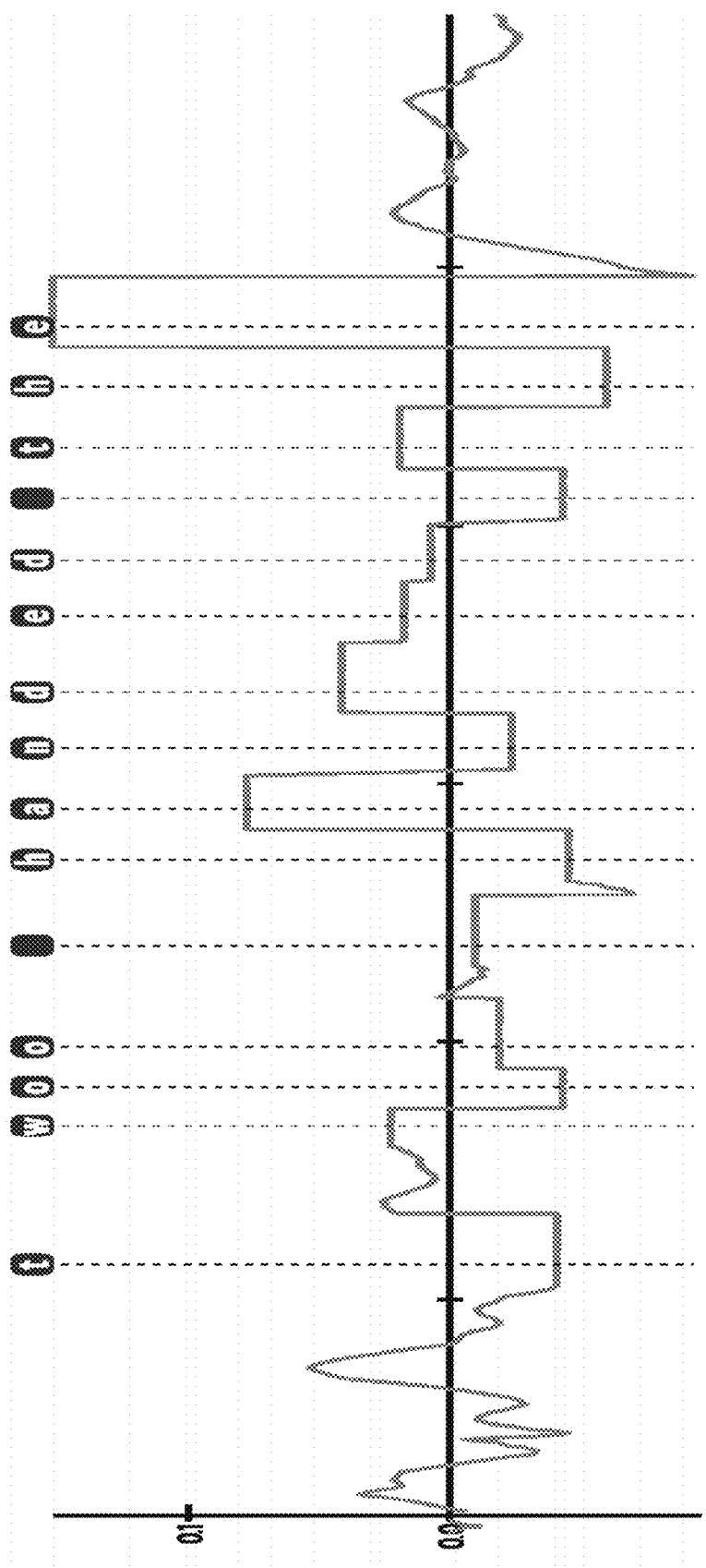
Figure 8:
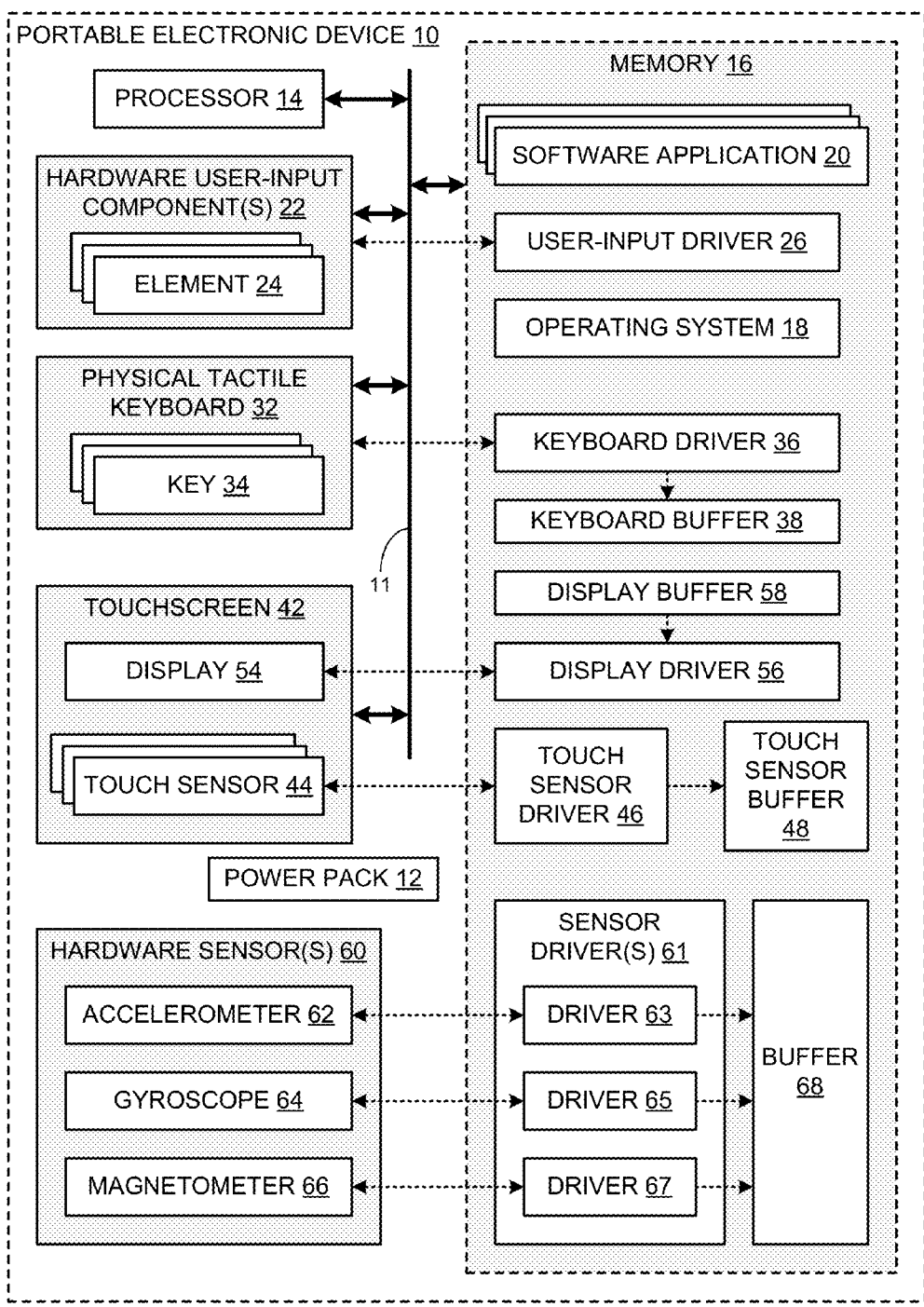
Figure 9:
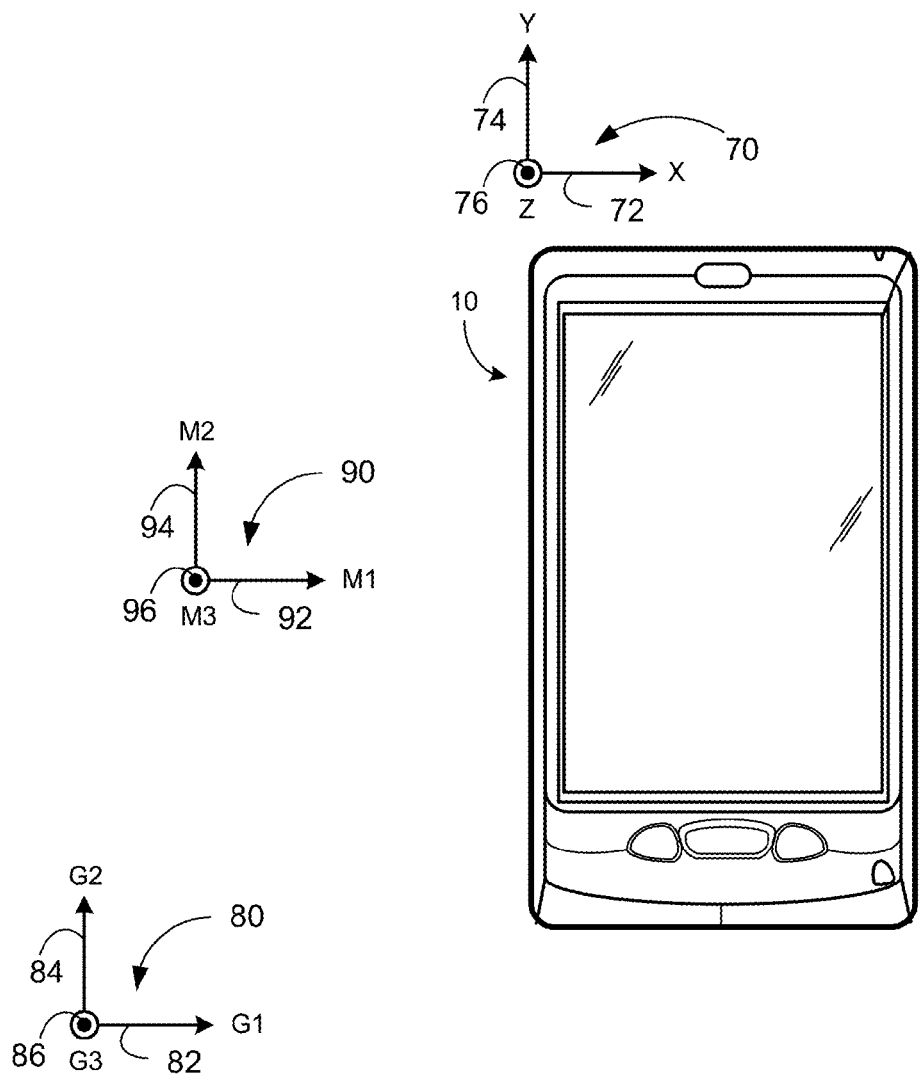

FIGS. 4-1, 4-2, 4-3, 4-4, 4-5, and 4-6 illustrate, along a timeline, timing of example screenshots of an example portable electronic device, timing of example detected touch events and their respective touch event windows, and timing of example samples of actual hardware sensor output;

FIG. 5 shows example actual gyroscope data generated by a gyroscope in a portable electronic device and example fake gyroscope data;

FIG. 6 shows example actual gyroscope data generated by a gyroscope in a portable electronic device and example fake gyroscope data;

FIG. 7-1 shows example actual accelerometer data generated by an accelerometer in a portable electronic device, and FIG. 7-2 shows example accelerometer data, part of which is example actual accelerometer data and part of which is example fake accelerometer data;

FIG. 8 is a simplified functional block diagram of an example portable electronic device;

FIG. 9 is an illustration of an example portable electronic device and three coordinate systems;

Appendix A provides pseudo-code examples for how a sensor driver may control what, if any hardware sensor output is receivable by a process, using synchronous communication; and Appendix B provides pseudo-code examples for how a sensor drive may control what, if any hardware sensor output is receivable by a process, using asynchronous communication.

It will be appreciated that for simplicity and clarity of illustration, elements shown in the figures have not necessarily been drawn to scale. For example, the dimensions of some of the elements may be exaggerated relative to other elements for clarity.

DETAILED DESCRIPTION

A portable electronic device may have integrated therein a hardware user-input component that has multiple elements that are operable to accept user input through touch. The device's memory stores a user-input driver for use by the device's operating system to interface with the hardware user-input component. The user-input driver and the operating system are jointly operable to detect touch events of the elements.

For example, the hardware user-input component may be a physical tactile keyboard having multiple keys, and the user-input driver may be a software driver for the keyboard. The software driver and the operating system are jointly operable to detect touch keyboard events, such as a key press or a key release. FIG. 1 is an illustration of an example portable electronic device 100. A physical tactile keyboard 102 having multiple keys 104 is integrated in the portable electronic device 100. Although not illustrated in FIG. 1, a software driver for the keyboard 102 is stored in the memory of the portable electronic device 100.

In another example, the hardware user-input component may be a touchscreen having multiple touch sensors, and the user-input driver may be a software driver for the touch sensors. The touchscreen may be touched by a finger or hand, or by a stylus or other tool. The software driver and the operating system are jointly operable to detect touch events of the touch sensors, such as a touchscreen press or a touchscreen release or a touchscreen glide or drag. In this example, the device's memory stores a display driver for displaying images on the touchscreen. In the event that an image of a virtual keyboard having multiple keys is displayed on the touchscreen, the touch events may include touch keyboard events, such as a key press or a key release or a key swipe (changing direction of a finger or stylus or other indicator while moving over a key), for keys in the virtual keyboard. FIG. 2 is an illustration of an example portable electronic device 200. A touchscreen 202 is integrated in the portable electronic device 200. In the example illustrated in FIG. 2, an image 204 of a virtual keyboard having multiple keys is displayed on the touchscreen 202. Although not illustrated in FIG. 2, a software driver for the touchscreen 202 is stored in the memory of the portable electronic device 200.

Figure 3:
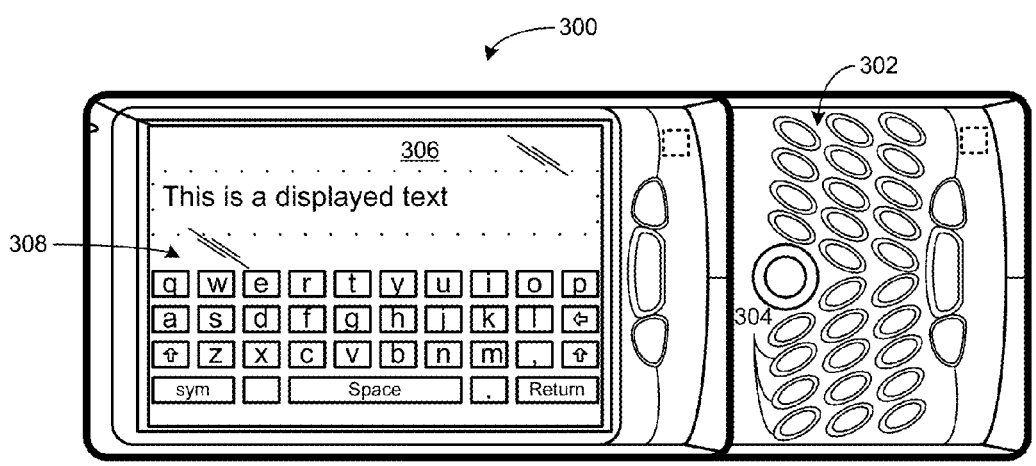
FIG. 3 is an illustration of an example portable electronic device, of an example physical tactile keyboard having multiple keys integrated in the device, and of an example touchscreen integrated in the device.

In a further example, the device may have integrated therein both a physical tactile keyboard having multiple keys and a touchscreen having multiple touch sensors. In this example, the device's memory stores a software driver for the keyboard, a software driver for the touch sensors, and a display driver for displaying images on the touchscreen. The software driver for the keyboard and the operating system are jointly operable to detect touch keyboard events, such as a key press or a key release. In the event that an image of a virtual keyboard having multiple keys is displayed on the touchscreen, the touch events may include touch keyboard events, such as a key press or a key release or a key swipe, for keys in the virtual keyboard. FIG. 3 is an illustration of an example portable electronic device 300. A physical tactile keyboard 302 having multiple keys 304 is integrated in the portable electronic device 300, and a touchscreen 306 is integrated in the portable electronic device 300. In the example illustrated in FIG. 3, an image 308 of a virtual keyboard having multiple keys is displayed on the touchscreen 306. Although not illustrated in FIG. 3, a software driver for the keyboard 302 and a software driver for the touchscreen 306 are stored in the memory of the portable electronic device 300.

Typing on the keyboard or touching the touchscreen may cause movement of the device or changes in the device's orientation or both. The magnitude and direction of movement of the device may be in the range of fractions of millimeters to several centimeters, and may be 1-dimensional, 2-dimensional or 3-dimensional. The movement of the device or changes in the device's orientation may depend on several factors, including, for example, the size of the device, the size of the hardware user-input component, what sequence of touches is being made, whether the user is left-handed or right-handed, and how the device is stabilized. This movement or change in orientation may be more pronounced depending on the stability of the device in its environment. For example, a portable electronic device balanced on a single knee may be less stable than a portable electronic device lying on a flat surface such as a tabletop. In another example, a portable electronic device that is held in one or both hands of its user will experience slight movements as the user types or touches the touchscreen.

The portable electronic device may include one or more hardware sensors, each operable to produce hardware sensor output that is indicative of the orientation of the device within its environment, or that is indicative of motion of the device within its environment, or that is indicative of both the orientation and motion of the device within its environment. A non-exhaustive list of examples for such hardware sensors includes accelerometers, magnetometers and gyroscopes. A sensor driver for each such hardware sensor is stored in the device's memory, for use by the device's operating system to interface with the hardware sensors. For example, detected rotation of the device by approximately 90 degrees may result in the operating system switching a display orientation from landscape to portrait or vice versa. In another example, detected placement of the device display-side down may result in the dimming of the display or in the locking of the device.

Hardware sensor output indicative of movement of the device or indicative of changes in orientation of the device or indicative of both may be analyzed to deduce what keys have been activated on the keyboard or to deduce where touches have been made on the touchscreen. This analysis may reveal sensitive information. For example, this analysis may reveal a confidential password that has been typed at the keyboard. In another example, this analysis may reveal a specific location on a touchscreen that has been touched, thus acting as a confidential password. In a further example, this analysis may reveal a specific sequence of locations on a touchscreen that have been touched, thus acting as a confidential password.

Indeed, a software application ("malware") stored in the device's memory may be designed or modified to conduct such a malicious attack. The software application is executed by the processor as a malware process, and the attack involves the malware process receiving hardware sensor output indicative of movement of the device or indicative of changes in orientation of the device or indicative of both. The attack further involves analysis of the received output. The process may perform the analysis in the device, or may communicate the received output via a communication interface of the device to an external server for analysis by the external server, or may perform an initial analysis in the device and may communicate the received output via the communication interface of the device to the external server for further analysis.

Not all processes that receive hardware sensor output are malicious. There are legitimate reasons for a process to receive hardware sensor output. For example, a pedometer software application receives accelerometer output in order to calculate how far the user wearing or carrying the device has walked. In another example, a game application receives accelerometer output and/or gyroscope output in order to provide better user control and to adjust the displayed image to reflect a certain visual perspective.

While a software application stored in the device's memory is being executed by the processor as a process, there may be time periods throughout which the device's operating system is operable to notify the process of any detected touch events, and the process is sometimes referred to as running "in the foreground" or "in focus" throughout those time periods. In the examples where the device includes a keyboard, either a physical tactile keyboard or a keyboard image displayed on a touchscreen, detected touch keyboard events are passed to the process while it is running "in the foreground" or "in focus". In the examples where the device includes a touchscreen, detected touch events are passed to the process while it is running "in the foreground" or "in focus". While the software application is being executed by the processor as a process, there may be time periods throughout which the device's operating system is operable not to notify the process of any detected touch events, and the process is sometimes referred to as running "in the background" or "out of focus" throughout those time periods. Generally, at any given time only one process is running "in the foreground" or "in focus" and all other processes are running "in the background" or "out of focus".

FIGS. 4-1, 4-2, 4-3, 4-4, 4-5 and 4-6 are almost identical to one another. They differ only in the lower two sequences illustrating timing of samples of hardware sensor output to a first process and to a second process. FIGS. 4-1, 4-2, 4-3, 4-4, 4-5, and 4-6, collectively referred to herein as "FIG. 4", illustrate, along a timeline 400, timing of example screenshots of a display of a portable electronic device, for example, portable electronic device 100 or portable electronic device 200 or portable electronic device 300. A first software application stored in the device's memory is being executed by the device's processor as a first process, and a second software application stored in the device's memory is being executed by the device's processor as a second process. From time T1 to time T2, denoted time period [T1,T2], and from time T3 to time T4, denoted time period [T3,T4], the device's operating system is operable to notify the first process of any detected touch events and not to notify the second process of any detected touch events. From time T2 to time T3, denoted time period [T2,T3], the device's operating system is operable to notify the second process of any detected touch events and not to notify the first process of any detected touch events.

An example screenshot 402, captured sometime during time period [T1,T2], shows an image 404, which is associated with the first process, in the foreground, and an image 406, which is associated with the second process, partially obscured in the background. The device's operating system notifies the first process of touch events that were detected during time period [T1,T2], for example, touch events 408, and does not notify the second process of the touch events that were detected during time period [T1,T2]. In the example illustrated in FIG. 4, detected touch events 408 collectively correspond to the text "Yum!", the first process results from execution by the device's process of an example chat software application, and image 404 displays text "Yum" as part of the chat entry by participant A.

An example screenshot 412, captured sometime during time period [T2,T3], shows an image 414, which is associated with the first process, partially obscured in the background, and an image 416, which is associated with the second process, in the foreground. The device's operating system notifies the second process of touch events that were detected during time period [T2,T3], for example, touch events 418, and does not notify the first process of the touch events that were detected during time period [T2,T3]. In the example illustrated in FIG. 4, detected touch events 418 collectively correspond to the text "Q7%", the second process results from execution by the device's process of an example online banking application, and image 416 displays text "***" in a password entry field to indicate that the actual text input "Q7%" has been received by the second process.

An example screenshot 422, captured sometime during time period [T3,T4], shows an image 424, which is associated with the first process, in the foreground, and an image 426, which is associated with the second process, partially obscured in the background. The device's operating system notifies the first process of touch events that were detected during time period [T3,T4], for example, touch events 428, and does not notify the second process of the touch events that were detected during time period [T3,T4]. In the example illustrated in FIG. 4, detected touch events 428 collectively correspond to the text "How", and image 424 displays text "How" as part of the chat entry by participant A.

In time periods throughout which the device's operating system is operable to notify a process of any detected touch events, the process can directly deduce with complete accuracy from those notifications what keys have been activated on the keyboard or where touches have been made on the touchscreen or both. Any analysis of hardware sensor output sampled during those time periods will not yield additional information regarding touch events. Consequently any concern regarding the process receiving hardware sensor output can be directed to hardware sensor output sampled during those time periods throughout which the device's operating system is not operable to notify the process of any detected touch events. Referring to the simplified example illustrated in FIG. 4, a sequence 440 of example samples of hardware sensor output is shown. Concern regarding the first process receiving hardware sensor output can be directed to samples 460 of hardware sensor output sampled during time period [T2,T3], and concern regarding the second process receiving hardware sensor output can be directed to samples 450 of hardware sensor output sampled during time period [T1,T2] and to samples 470 of hardware sensor output sampled during time period [T3,T4].

Prevent Receipt Approach to Thwarting an Attack

One approach to thwarting an attack is to prevent receipt of hardware sensor output. If the hardware sensor output is not receivable by a process, the hardware sensor output cannot be analyzed by the process (or sent by the process to a remote server for analysis), and thus the process (or remote server) cannot deduce what keys have been activated on the keyboard or where touches have been made on the touchscreen or both.

For any process, there are time periods throughout which the device's operating system is operable not to notify the process of any detected touch events. To implement the "prevent receipt" approach to thwarting an attack, the sensor driver or the device's operating system or both may be configured such that any hardware sensor output sampled during those time periods is not receivable by the process. Reference is made to the simplified example illustrated in FIG. 4-1. Due to the configuration of the sensor driver of the device's operating system or both, a sequence 4-1-1 of samples of hardware sensor output is receivable by the first process. Sequence 4-1-1 differs from sequence 440 in that samples 460 are omitted (because samples 460 are sampled during time period [T2,T3] throughout which the device's operating system is operable not to notify the first process of any detected touch events). Thus even if the first process requests samples of hardware sensor output, the first process will not be able to deduce that the text "Q7%" was typed during time period [T2,T3], because hardware sensor output sampled while the text was being typed is not receivable and is not received by the first process. Due to the configuration of the sensor driver of the device's operating system or both, a sequence 4-1-2 of samples of hardware sensor output is receivable by the second process. Sequence 4-1-2 differs from sequence 440 in that samples 450 are omitted (because samples 450 are sampled during time period [T1,T2] throughout which the device's operating system is operable not to notify the second process of any detected touch events) and samples 470 are omitted (because samples 470 are sampled during time period [T3,T4] throughout which the device's operating system is operable not to notify the second process of any detected touch events). Thus even if the second process requests samples of hardware sensor output, the second process will not be able to deduce that the text "Yum!" was typed during time period [T1,T2] and will not be able to deduce that the text "How" was typed during time period [T3,T4], because hardware sensor output sampled while the text "Yum!" was being typed and hardware sensor output sampled while the text "How" was being typed is not receivable and is not received by the second process.

Fake Hardware Sensor Output Approach to Thwarting an Attack

Another approach to thwarting an attack is to provide fake hardware sensor output from which it is impossible to deduce the actual hardware sensor output and from which it is impossible to distinguish the touch events.

As mentioned above, for any process, there are time periods throughout which the device's operating system is operable not to notify the process of any detected touch events. To implement the "fake hardware sensor output" approach to thwarting an attack, the sensor driver or the device's operating system or both may be configured such that, instead of actual hardware sensor output sampled during those time periods, fake hardware sensor output is receivable by the process. This "fake hardware sensor output" approach is similar to the "prevent receipt" approach, in that hardware sensor output sampled during time periods throughout which the device's operating system is operable not to notify a process of any detected touch events is not receivable by the process.

Reference is made to the simplified example illustrated in FIG. 4-2. Due to the configuration of the sensor driver of the device's operating system or both, a sequence 4-2-1 of samples of hardware sensor output is receivable by the first process. Sequence 4-2-1 differs from sequence 440 in that sequence 4-2-1 contains samples 461 of fake hardware sensor output instead of samples 460 (because samples 460 are sampled during time period [T2,T3] throughout which the device's operating system is operable not to notify the first process of any detected touch events). Thus even if the first process requests samples of hardware sensor output, the first process will not be able to deduce that the text "Q7%" was typed during time period [T2,T3], because hardware sensor output sampled while the text was being typed is not receivable and is not received by the first process.

Due to the configuration of the sensor driver of the device's operating system or both, a sequence 4-2-2 of samples of hardware sensor output is receivable by the second process. Sequence 4-2-2 differs from sequence 440 in that sequence 4-2-2 contains i) samples 451 of fake hardware sensor output instead of samples 450 (because samples 450 are sampled during time period [T1,T2] throughout which the device's operating system is operable not to notify the second process of any detected touch events) and ii) samples 471 of fake hardware sensor output instead of samples 470 (because samples 470 are sampled during time period [T3,T4] throughout which the device's operating system is operable not to notify the second process of any detected touch events). Thus even if the second process requests samples of hardware sensor output, the second process will not be able to deduce that the text "Yum!" was typed during time period [T1,T2] and will not be able to deduce that the text "How" was typed during time period [T3,T4], because hardware sensor output sampled while the text "Yum!" was being typed and hardware sensor output sampled while the text "How" was being typed is not receivable and is not received by the second process.

Sufficiently Low Sampling Rate Approach to Thwarting an Attack

Another approach to thwarting an attack is to provide hardware sensor output to a process at a sampling rate that is no higher than a "sufficiently low sampling rate", which is sufficiently low that touch events cannot be distinguished from the provided samples of hardware sensor output. An example sufficiently low sampling rate is in the range of approximately 1 Hz to approximately 2 Hz, that is, a sampling rate of approximately one sample per second to approximately two samples per second.

As mentioned above, for any process, there are time periods throughout which the device's operating system is operable not to notify the process of any detected touch events. To implement the "sufficiently low sampling rate" approach to thwarting an attack, the sensor driver or the device's operating system or both may be configured such that hardware sensor output sampled during those time periods is receivable to the process at a sampling rate no higher than the sufficiently low sampling rate.

Reference is made to the simplified example illustrated in FIG. 4-3. Due to the configuration of the sensor driver of the device's operating system or both, a sequence 4-3-1 of samples of hardware sensor output is receivable by the first process. Sequence 4-3-1 differs from sequence 440 in that samples 460 are included in sequence 4-3-1 at a sampling rate no higher than the sufficiently low sampling rate (because samples 460 are sampled during time period [T2,T3] throughout which the device's operating system is operable not to notify the first process of any detected touch events). Thus even if the first process requests samples of hardware sensor output, the first process will not be able to deduce that the text "Q7%" was typed during time period [T2,T3], because the text "Q7%" cannot be distinguished from the few samples 460 receivable by (and possibly even received by) the first process.

Due to the configuration of the sensor driver of the device's operating system or both, a sequence 4-3-2 of samples of hardware sensor output is receivable by the second process. Sequence 4-3-2 differs from sequence 440 in that samples 450 are included in sequence 4-3-2 at a sampling rate no higher than the sufficiently low sampling rate (because samples 450 are sampled during time period [T1,T2] throughout which the device's operating system is operable not to notify the second process of any detected touch events) and samples 470 are included in sequence 4-3-2 only at the sufficiently low sampling rate (because samples 470 are sampled during time period [T3,T4] throughout which the device's operating system is operable not to notify the second process of any detected touch events). Thus even if the second process requests samples of hardware sensor output, the second process will not be able to deduce that the text "Yum!" was typed during time period [T1,T2], because the text "Yum!" cannot be distinguished from the few samples 450 receivable by (and possibly even received by) the second process, and will not be able to deduce that the text "How" was typed during time period [T3,T4], because the text "How" cannot be distinguished from the few samples 460 receivable by (and possibly even received by) the second process.

Keyboard Displayed for Virtual Keyboard

Where the device does not have a physical tactile keyboard and an image of a virtual keyboard is displayable on a touchscreen of the device, and where concern is specifically for detected touch events that represent input via the virtual keyboard, rather than any type of detected touch events, the question of whether the image of the virtual keyboard is displayed or not is relevant. Any touch events detected while the image of the virtual keyboard is not displayed on the touchscreen do not represent input via the virtual keyboard. Consequently any concern regarding the process receiving hardware sensor output can be directed to hardware sensor output sampled while the image of the virtual keyboard is displayed during those time periods throughout which the device's operating system is not operable to notify the process of any detected touch events.

Keyboard Displayed Variant of Prevent Receipt Approach

As mentioned above, for any process, there are time periods throughout which the device's operating system is operable not to notify the process of any detected touch events. In an alternative implementation of the "prevent receipt" approach to thwarting an attack, the sensor driver or the device's operating system or both may be configured such that any hardware sensor output sampled while the image of the virtual keyboard is displayed during those time periods is not receivable by the process. Thus even if the process requests samples of hardware sensor output, the process will not be able to deduce what keys have been activated on the virtual keyboard, because any hardware sensor output received by the process was not sampled while touches made on the touchscreen represented input to the virtual keyboard.

Keyboard Displayed Variant of Fake Hardware Sensor Output Approach

As mentioned above, for any process, there are time periods throughout which the device's operating system is operable not to notify the process of any detected touch events. In an alternative implementation of the "fake hardware sensor output" approach to thwarting an attack, the sensor driver or the device's operating system or both may be configured such that any hardware sensor output sampled while the image of the virtual keyboard is displayed during those time periods is not receivable by the process and that the process receives instead fake hardware sensor output. Thus even if the process requests samples of hardware sensor output, the process will not be able to deduce what keys have been activated on the virtual keyboard, because any actual hardware sensor output received by the process was not sampled while touches made on the touchscreen represented input to the virtual keyboard.

Keyboard Displayed Variant of Sufficiently Low Sampling Rate Approach

As mentioned above, for any process, there are time periods throughout which the device's operating system is operable not to notify the process of any detected touch events. In an alternative implementation of the "sufficiently low sampling rate" approach to thwarting an attack, the sensor driver or the device's operating system or both may be configured such that any hardware sensor output sampled while the image of the virtual keyboard is displayed during those time periods is receivable by the process at a sampling rate no higher than the sufficiently low sampling rate. Thus even if the process requests samples of hardware sensor output, the process will not be able to deduce what keys have been activated on the virtual keyboard, because the input to the virtual keyboard cannot be distinguished from the few samples of hardware sensor output received by the process.

Touch Event Windows

For a physical tactile keyboard, there is a hardware delay and a software delay involved in detection of a key press. As expected, differences in hardware will result in different hardware delays, and differences in software will result in different software delays. There is movement or change in orientation or both of the device as a key is being pressed before the software detects that the key press has occurred. Thus, for the example of a physical tactile keyboard, touch event windows may be defined to start slightly before a key press is detected, such as in a range of approximately 20 milliseconds to 75 milliseconds, for example, 50 milliseconds, before the key press is detected. For hardware/software combinations that detect key presses more quickly, the touch event windows may be defined to start even closer to the time the key press is detected. For hardware/software combinations that detect key presses more slowly, the touch event windows may be defined to start even farther ahead from the time the key press is detected.

For a physical tactile keyboard, there is a hardware delay and a software delay involved in detection of a key release. As expected, differences in hardware will result in different hardware delays, and differences in software will result in different software delays. Furthermore, the movement of the device or change in orientation of the device or both is likely to be different for different sequences of key presses and key releases. For example, in a QWERTY keyboard layout, typing "a" followed "e" may result in different movement of the device or change in orientation of the device or both than that resulting from typing "p" followed by "h". Thus, for the example of a physical tactile keyboard, touch event windows may be defined to end sometime after a key release is detected, for example, approximately 200 milliseconds after the key release is detected. For hardware/software combinations that detect key releases more quickly or for which different sequences of key presses and releases are less distinctive in terms of movement or change in orientation of device or both, the touch event windows may be defined to end even closer to the time the key release is detected. For hardware/software combinations that detect key releases more slowly or for which different sequences of key presses and releases are more distinctive in terms of movement or change in orientation of device or both, the touch event windows may be defined to end even farther after the time the key release is detected.

Defining touch event windows for a touchscreen is more difficult than for a physical tactile keyboard, partly because of the variety of types of touch events (touchscreen press, touchscreen release, touchscreen glide or drag, key swipe). For a touchscreen, the duration and timing of touch event windows may depend upon how quickly the touchscreen registers a touch event. As an arbitrary example, touch event windows may be defined to start approximately 75 milliseconds before a touchscreen event is detected and to end approximately 200 milliseconds after the touchscreen event is detected.

Touch event windows may be defined for any touch events and for any hardware user-input component having multiple elements that are operable to accept user input through touch. In the simplified example illustrated in FIGS. 4-4, 4-5 and 4-6, touch events 408, 418 and 428 and their respective touch event windows 409, 419 and 429 are illustrated. Some touch events have overlapping touch event windows, resulting in a single extended touch event window.

Touch Event Window Variant of Prevent Receipt Approach

As mentioned above, for any process, there are time periods throughout which the device's operating system is operable not to notify the process of any detected touch events. In an alternative implementation of the "prevent receipt" approach to thwarting an attack, the sensor driver or the device's operating system or both may be configured such that any hardware sensor output sampled during touch event windows that occur in those time periods is not receivable by the process.

Reference is made to the simplified example illustrated in FIG. 4-4. Due to the configuration of the sensor driver of the device's operating system or both, a sequence 4-4-1 of samples of hardware sensor output is receivable by the first process. Sequence 4-4-1 differs from sequence 440 in that those of samples 460 sampled during touch event windows 419 are omitted (because touch event windows 419 occur during time period [T2,T3]). Thus even if the first process requests samples of hardware sensor output, the first process will not be able to deduce that the text "Q7%" was typed during time period [T2,T3], because hardware sensor output sampled while the text was being typed is not receivable and is not received by the first process.

Due to the configuration of the sensor driver of the device's operating system or both, a sequence 4-4-2 of samples of hardware sensor output is receivable by the second process. Sequence 4-4-2 differs from sequence 440 in that those of samples 450 sampled during touch event windows 409 are omitted (because touch event windows 409 occur during time period [T1,T2]) and those of samples 470 sampled during touch event windows 429 are omitted (because touch event windows 429 occur during time period [T3,T4]). Thus even if the second process requests samples of hardware sensor output, the second process will not be able to deduce that the text "Yum!" was typed during time period [T1,T2] and will not be able to deduce that the text "How" was typed during time period [T3,T4], because hardware sensor output sampled while the text "Yum!" was being typed and hardware sensor output sampled while the text "How" was being typed is not receivable and is not received by the second process.

Touch Event Window Variant of Fake Hardware Sensor Output Approach

As mentioned above, for any process, there are time periods throughout which the device's operating system is operable not to notify the process of any detected touch events. In an alternative implementation of the "fake hardware sensor output" approach to thwarting an attack, the sensor driver or the device's operating system or both may be configured such that any hardware sensor output sampled during touch event windows that occur in those time periods is not receivable by the process.

Alternatively, fake hardware sensor output may be provided to the process instead of actual hardware sensor output sampled during touch event windows that occur in time periods throughout which the device's operating system is operable not to notify the process of any detected touch events.

Reference is made to the simplified example illustrated in FIG. 4-5. Due to the configuration of the sensor driver of the device's operating system or both, a sequence 4-5-1 of samples of hardware sensor output is receivable by the first process. Sequence 4-5-1 differs from sequence 440 in that sequence 4-5-1 contains samples 462 of fake hardware sensor output and samples 463 of fake hardware sensor output instead of those of samples 460 sampled during touch event windows 419 (because touch event windows 419 occur during time period [T2,T3]). Thus even if the first process requests samples of hardware sensor output, the first process will not be able to deduce that the text "Q7%" was typed during time period [T2,T3], because hardware sensor output sampled while the text was being typed is not receivable and is not received by the first process.

Due to the configuration of the sensor driver of the device's operating system or both, a sequence 4-5-2 of samples of hardware sensor output is receivable by the second process. Sequence 4-5-2 differs from sequence 440 in that sequence 4-5-2 contains samples 452 of fake hardware sensor output and samples 453 of fake hardware sensor output instead of those of samples 450 sampled during touch event windows 409 (because touch event windows 409 occur during time period [T1,T2]), and in that sequence 4-5-2 contains samples 472 of fake hardware sensor output instead of those of samples 470 sampled during touch event windows 429 (because touch event windows 429 occur during time period [T3,T4]).

Touch Event Window Variant of Sufficiently Low Sampling Rate Approach

As mentioned above, for any process, there are time periods throughout which the device's operating system is operable not to notify the process of any detected touch events. In an alternative implementation of the "sufficiently low sampling rate" approach to thwarting an attack, the sensor driver or the device's operating system or both may be configured such that hardware sensor output sampled during touch event windows that occur in those time periods throughout is receivable to the process at a sampling rate no higher than the sufficiently low sampling rate.

Reference is made to the simplified example illustrated in FIG. 4-6. Due to the configuration of the sensor driver of the device's operating system or both, a sequence 4-6-1 of samples of hardware sensor output is receivable by the first process. Sequence 4-6-1 differs from sequence 440 in that those of samples 460 sampled during touch event windows 419 are included in sequence 4-6-1 at a sampling rate no higher than the sufficiently low sampling rate (because touch event windows 419 occur during time period [T2,T3]). Thus even if the first process requests samples of hardware sensor output, the first process will not be able to deduce that the text "Q7%" was typed during time period [T2,T3], because the text "Q7%" cannot be distinguished from the few samples 460 receivable by (and possibly even received by) the first process.

Due to the configuration of the sensor driver of the device's operating system or both, a sequence 4-6-2 of samples of hardware sensor output is receivable by the second process. Sequence 4-6-2 differs from sequence 440 in that those of samples 450 sampled during touch event windows 409 are included in sequence 4-6-2 at a sampling rate no higher than the sufficiently low sampling rate (because touch event windows 409 occur during time period [T1,T2]) and those of samples 470 sampled during touch event windows 429 are included in sequence 4-6-2 at a sampling rate no higher than the sufficiently low sampling rate (because touch event windows 429 occur during time period [T3,T4]). Thus even if the second process requests samples of hardware sensor output, the second process will not be able to deduce that the text "Yum!" was typed during time period [T1,T2], because the text "Yum!" cannot be distinguished from the few samples 450 receivable by (and possibly even received by) the second process, and will not be able to deduce that the text "How" was typed during time period [T3,T4], because the text "How" cannot be distinguished from the few samples 460 receivable by (and possibly even received by) the second process.

Stability Comparison of Approaches

In sequences 4-1-1 and 4-4-1, there are gaps in samples that are receivable by the first process, which may result in disruption to or instability of the first process, if the first process expects to receive a continual supply of samples of hardware sensor output. Similarly, in sequences 4-1-2 and 4-4-2, there are gaps in samples that are receivable by the second process, which may result in disruption to or instability of the second process, if the second process expects to receive a continual supply of samples of hardware sensor output.

Receipt of samples at a sampling rate no higher than the sufficiently low sampling rate, as in sequences 4-3-1 and 4-6-1, may result in disruption to or instability of the first process, if the first process expects to receive a continual supply of samples of hardware sensor output. Similarly, receipt of samples at a sampling rate no higher than the sufficiently low sampling rate, as in sequences 4-3-2 and 4-6-2, may result in disruption to or instability of the second process, if the second process expects to receive a continual supply of samples of hardware sensor output.

In contrast, in sequences 4-2-1 and 4-5-1, there are no gaps in samples that are receivable by the first process, and in sequences 4-2-2 and 4-5-2, there are no gaps in samples that are receivable by the second process.

For some processes, the "sufficiently low sampling rate" approach may provide samples at a sufficient rate to avoid disruption or instability. It is also possible to substitute for the sufficiently low sampling rate a low sampling rate that is lower than the sampling rate at which hardware sensor output is receivable when the device's operating system is operable to notify the process of any detected touch events, yet which is higher than the sufficiently low sampling rate. For example, instead of providing hardware sensor output to a process at a sampling rate that is no higher than approximately 1 Hz to approximately 2 Hz, hardware sensor output may be provided at a sampling rate of approximately 5 Hz to approximately 10 Hz. This may provide less protection against an attack, but more stability than the pure "sufficiently low sampling rate" approach. For other processes, the "fake hardware sensor output" approach to thwarting an attack may result in more stable operation.

Where implemented in the portable electronic device, any of the foregoing approaches to thwarting an attack is to be applied to all processes resulting from the execution by the device's processor of software applications stored in the device's memory. However, to exempt one or more processes from the application of any of the foregoing approaches, the portable electronic device may maintain a list of the exempted one or more processes (or of their respective software applications), and the sensor driver or device's operating system or both may be configured not to apply any of the thwarting approaches to processes identified in the list. In other words, an exempt process is a process that has permission to receive samples of actual hardware sensor output at a requested sampling rate, even if the requested sampling rate is higher than the sufficiently low sampling rate, at all times that the exempt process is running, regardless of whether the device's operating system is operable to notify or not to notify the process of any detected touch events. Designation of a software application or its process as exempt may be accomplished during or after installation of the software application on the portable electronic device. Designation of a software application or its process as exempt may be accomplished in any suitable manner. The precise implementation is beyond the scope of this document. However, some examples are: the manufacturer of the device dictating that a particular software application is exempt, receiving an indication from the user of the device that the particular software application is exempt, or determining that software applications from a particular creator are exempt.

Control of Hardware Sensor Output Receivable by Process

In general, hardware sensor output is receivable by a process either through synchronous communication or through asynchronous communication. Synchronous communication, also known as polling, involves the process opening a connection to the sensor driver and, at a specific frequency (the sampling rate), calling in to the sensor driver to request a new sample. A timeout is defined as the reciprocal of the sampling rate. The sensor driver may respond to each request with a new sample or an indication that no new sample is available. Alternatively, the sensor driver may respond to the request with the current sensor data only once the timeout specified by the sampling rate has been reached; that is, the operating system halts running the process until the timeout is reached, then provides the current sensor data. Asynchronous communication, also known as event-driven communication, involves the process requesting to be informed at a specific interval, specified by the sampling rate, about the current sensor reading. For example, interrupts or signals may be used to inform the process. Different processes may request hardware sensor output at different sampling rates. In all cases, it is the sensor driver, together with the device's operating system, that are responsible to provide hardware sensor output to a process that requests samples. As such, it is the sensor driver or the device's operating system or both, that can be configured to control what, if any, hardware sensor output is receivable by a process.

Pseudo-code examples of how the sensor driver may control what, if any, hardware sensor output is receivable by a process, are provided in Appendix A, for synchronous communication, and in Appendix B, for asynchronous communication.

Buffering for Touch Event Window Variants

As mentioned above, a touch event window starts slightly before a touch event is detected. Thus, to implement touch event window variants of the approaches described above, the sensor driver or the device's operating system or both may be configured to buffer hardware sensor output for a period of time prior to samples of the hardware sensor output being made receivable to a process. The period of time is equal to the time between when the touch event window starts and when the touch event is detected. For example, sensor samples may be stored in a first-in-first-out (FIFO) queue of a fixed size, where the current sensor sample is placed at the end of the queue and the sensor sample at the head of the queue is removed and returned to the process every timeout (the timeout being the reciprocal of the sampling rate).

How to Fake Hardware Sensor Output

Fake hardware sensor output may be fabricated from actual hardware sensor output by passing the actual hardware sensor output through a low pass filter, thus removing from the hardware sensor output any information from which touch events can be distinguished. For example, by averaging multiple samples together, something similar to a low pass filter is achieved. For every sample, the value returned to the process is actually the average of the past N samples. The value of N is used to specify how low the threshold is. A threshold of approximately 1 Hz to 2 Hz may be used, for example.

Alternatively, fake hardware sensor output may be fabricated from any one or any combination of the following: i) random data, ii) prefabricated data such as constants and fixed waveforms, and iii) actual hardware sensor output sampled when no touch events were detected.

FIG. 5 shows example actual gyroscope data generated by a gyroscope in a portable electronic device and example fake gyroscope data. A sequence of keys is typed on a keyboard of the portable electronic device, with the timing of each key press indicated by a vertical line. X-component, Y-component and Z-component waveforms of actual gyroscope data are illustrated prior to the timing of the first key press. Slightly prior to the timing of the first key press, the actual gyroscope data is replaced with fabricated constant values for the X-component, Y-component and Z-component. The fabricated constant values are identical to the most-recent actual gyroscope values and are maintained for the entire typed sequence. Analysis of the data shown in FIG. 5 will not yield which keys have been pressed.

FIG. 6 shows example actual gyroscope data generated by a gyroscope in a portable electronic device and example fake gyroscope data. A sequence of keys is typed on a keyboard of the portable electronic device, with the timing of each key press indicated by a vertical line. A Y-component waveform of actual gyroscope data is illustrated prior to the timing of the first key press. Slightly prior to the timing of each key press, the actual gyroscope data is replaced with a fabricated constant value for the Y-component. The fabricated constant value is identical to the most-recent actual gyroscope value and is maintained until the earlier of i) the end of a touch event window for that key press, or ii) slightly prior to the next key press, at which point an updated most-recent constant value is used for the Y-component. Thus a fabricated constant value is shown from slightly before the first key press to sometime after the first key press, followed by actual gyroscope data, followed by a new fabricated constant value identical to the most-recent actual gyroscope value slightly before the second key press. This technique of fabricating fake gyroscope data may also be applied to the X-component and to the Z-component waveforms of the gyroscope data; the Y-component is illustrated alone in FIG. 6 for clarity. Analysis of the data shown in FIG. 6 will not yield which keys have been pressed.

FIG. 7-1 shows example actual accelerometer data generated by an accelerometer in a portable electronic device. A sequence of keys is typed on a keyboard of the portable electronic device, with the timing of each key press indicated by a vertical line. An inset shows magnified detail of a portion of the Z-component of the example actual accelerometer data. There are spikes in the Z-component of the example actual accelerometer data around the timing of a key press. FIG. 7-2 shows example accelerometer data, part of which is actual accelerometer data generated by the accelerometer and part of which is fake accelerometer data. The sequence of keys is typed on the keyboard, with the timing of each key press indicated by a vertical line. The example accelerometer data shown from approximately 75 milliseconds before each key press until approximately 200 milliseconds after the key press is fake accelerometer data.

An inset shows magnified detail of a portion of the Z-component. Due to the replacement of actual accelerometer data with fabricated fake accelerometer data, the spikes in the Z-component of the example actual accelerometer data around the timing of the key press have been eliminated. Analysis of the data shown in FIG. 7-2 will not yield which keys have been pressed.

In this example, the fake accelerometer data was fabricated by:

1) measuring the minimum and maximum value of Z-component accelerometer data ($Z_{min}$ and $Z_{max}$) from 175 milliseconds before the key press until 75 milliseconds before the key press;

2) calculating the slope of the line ($Z_{slope}$) through the point 175 milliseconds before the key press until 75 milliseconds before the key press; and 3) calculating each point of fake accelerometer data ($Z_i$), with i representing the time offset in milliseconds since the last nonfabricated (i.e., actual) data point, using the fabrication point equation $Z_i = Z_0 + i*Z_{slope} + (Z_{max} - Z_{min})\sin(i/60)$, where $Z_0$ is the actual data point immediately before the start of fabricated data.

The choice of i/60 is arbitrary. A different function may be used in the fabrication point equation instead of the sine function.

To fabricate gyroscope data using this method, the fabrication point equation was replaced with the following fabrication point equation $Z_i = Z_0 * \cos(i/175) + 0.25 (Z_{max} - Z_{min}) \sin(i/20)$, which was found to yield more plausible fake gyroscope data. The value 175 as the denominator for the fraction inside the cosine function represents a value that is close to the time for which fabricated data is to be used. The sine element was included in the equation to provide more variability.

Functional Block Diagram

FIG. 8 is a simplified functional block diagram of a portable electronic device 10, for example, portable electronic device 100, 200 or 300. For clarity, some components and features of portable electronic device 10 are not shown in FIG. 8 and are not explicitly described. Functions included in portable electronic device 10 may be implemented and distributed in any desired way among physical components of portable electronic device 10, such as integrated circuits, discrete components, printed circuit boards (PCBs), assemblies and subassemblies.

Portable electronic device 10 is powered by a power pack 12, for example, a battery pack, which may be removable or non-removable. Portable electronic device 10 comprises at least one processor 14 and a memory 16. Memory 16 stores an operating system 18 to be executed by processor 14. Memory 16 stores one or more software applications 20 to be executed by processor 14 as processes. Operating system 18 is to manage operation of portable electronic device 10. For example, operating system 18 may operate hardware components of portable electronic device 10 by means of software drivers and other means. In another example, operating system 18 may schedule execution of software by processor 14.

At least one hardware user-input component 22 is integrated in portable electronic device 10. Hardware user-input component 22 has multiple elements 24 that are operable to accept user input through touch. Memory 16 stores a user-input driver 26 for use by operating system 18 to interface with hardware user-input component 22. User-input driver 26 and operating system 18 are jointly operable to detect touch events of elements 24. Operating system 18 is operable to notify a process running "in the foreground" or "in focus" of any detected touch events. This notification may occur via synchronous communication such as polling, or via asynchronous communication such as interrupts, as described above with respect to hardware sensor output. Operating system 18 is operable not to notify a process running "in the background" or "out of focus" of any detected touch events.

A physical tactile keyboard is an example of a hardware user-input component. A touchscreen is another example of a hardware user-input component. The illustration of portable electronic device 10 as having integrated therein at least one hardware user-input component 22, a physical tactile keyboard 32 and a touchscreen 42 is not intended to suggest that this configuration is mandatory. Rather, portable electronic device 10 may have integrated therein only a single hardware user-input component 22, which may be physical tactile keyboard 32 (as is the case for portable electronic device 100) or touchscreen 42 (as is the case for portable electronic device 200) or any other suitable hardware user-input component. Similarly, portable electronic device 10 may have integrated therein only two hardware user-input components 22, for example, physical tactile keyboard 32 and touchscreen 42 (as is the case for portable electronic device 300).

Physical tactile keyboard 32 has multiple keys 34, and memory 16 may store a keyboard driver 36 for physical tactile keyboard 32. Keyboard driver 36 and operating system 18 are jointly operable to detect touch keyboard events, such as a key press or a key release. Keyboard driver 36 is coupled to a keyboard buffer 38 to store output captured by keyboard driver 36 from physical tactile keyboard 32.

Touchscreen 42 has multiple touch sensors 44, and memory 16 may store a touch sensor driver 46 for touch sensors 44. Touchscreen 42 may be touched by a finger or hand, or by a stylus or other tool. Touch sensor driver 46 and operating system 18 are jointly operable to detect touch events of the touch sensors, such as a touchscreen press or a touchscreen release or a touchscreen glide or drag, or a key swipe. Touch sensor driver 46 is coupled to a touch sensor buffer 48 to store output captured by touch sensor driver 46 from touch sensors 44. Operating system 18 is operable to sample and buffer the output captured by touch sensor driver 46. The sampling may be done only when an activation has been detected by touch sensor driver 46, or the operating system 18 may sample and buffer the output on a regular basis and may detect touch events by noticing a change in the buffered output.

Touchscreen 42 includes a display 54, and memory 16 may store a display driver 56 for displaying images on display 54. Display driver 56 is coupled to a display buffer 58 that stores the images to be displayed on display 54. A non-exhaustive list of examples for display 54 includes a Liquid Crystal Display (LCD), a Light Emitting Diodes (LED) display, and an Organic LED (OLED) display.

Coupling of memory 16, hardware user-input component(s) 22, physical tactile keyboard 32, and touchscreen 42 to processor 14 is illustrated in FIG. 8 as a single bus 11.

Portable electronic device 10 includes one or more hardware sensors 60, and memory 16 may store one or more sensor drivers 61, for use by operating system 18 to interface with hardware sensors 60. Hardware sensors 60 are operable to produce hardware sensor output that is indicative of the orientation of portable electronic device 10 within its environment, or that is indicative of motion of portable electronic device 10 within its environment, or that is indicative of both orientation and motion of portable electronic device 10 within its environment. A buffer 68 is operable to store output captured by the one or more sensor drivers 61.

For example, hardware sensors 60 may include an accelerometer 62, and sensor drivers 61 may include a driver 63 for use by operating system 18 to interface with accelerometer 62.

In another example, hardware sensors 60 may include a gyroscope 64, and sensor drivers 61 may include a driver 65 for use by operating system 18 to interface with gyroscope 64.

In yet another example, hardware sensors 60 may include a magnetometer 66, and sensor drivers 61 may include a driver 67 for use by operating system 18 to interface with magnetometer 66.

FIG. 9 is an illustration of example portable electronic device 10, and three coordination systems. A device coordination system 70 includes three mutually perpendicular axes 72, 74 and 76, respectively labeled "X", "Y" and "Z". Device coordination system 70 has a fixed orientation with respect to portable electronic device 10. In other words, device coordination system 70 moves and changes its orientation exactly as portable electronic device 10 moves and changes its orientation. A gravity coordination system 80 includes three mutually perpendicular axes 82, 84 and 86, respectively labeled "G1", "G2" and "G3". Gravity coordination system 80 has a fixed orientation with respect to the Earth's gravity. In other words, gravity coordination system 80 always indicates the direction of Earth's gravity. A magnetic field coordination system 90 includes three mutually perpendicular axes 92, 94 and 96, respectively labeled "M1", "M2" and "M3". Magnetic field coordination system 90 has a fixed orientation toward the Earth's magnetic field or toward another magnetic field that is stronger in the immediate vicinity of portable electronic device 10.

Hardware sensors 60 are mounted in portable electronic device 10 with a fixed orientation relative to device coordination system 70.

Hardware sensors 60 may provide "absolute" orientation and/or motion information with reference to gravity coordination system 80 or to magnetic field coordination system 90. For example, magnetometer 66 may provide information about the orientation of device coordination system 70 with reference to magnetic field coordination system 90. In another example, accelerometer 62 may provide information about the orientation of device coordination system 70 with reference to gravity coordination system 80.

Hardware sensors 60 may provide information about motion or changes in orientation or both that is relative to device coordination system 70 and without an absolute reference to gravity coordination system 80 or to magnetic field coordination system 90. For example, accelerometer 62 may provide information about motion of portable electronic device 10 along axes X, Y, and Z of device coordination system 70, and gyroscope 64 may provide information about orientation of portable electronic device 10 about axes X, Y, and Z of device coordination system 70.

Modification

Thus far, this document has discussed a device having integrated therein a hardware user-input component that has multiple elements that are operable to accept user input through touch, and a hardware sensor (for example, an accelerometer or a gyroscope or a magnetometer) that is affected by touch. However, for a device that has a touchscreen and where an image of a virtual keyboard having multiple keys is displayable on the touchscreen, an eye-tracking sensor integrated in the device may be used to track the user's eye movement and, when the image of the virtual keyboard is displayed, determine keyboard input from the output of the eye-tracking sensor. As described above, the device's operating system is operable to notify a process of any detected keyboard input while the process is running "in the foreground" or "in focus" and is operable not to notify the process of any detected keyboard input while the process is running "in the background" or "out of focus".

The approaches and variants described above with respect to hardware sensor output indicative of motion or change in orientation or both of the device in its environment may be modified to apply to output of the eye-tracking sensor. For example, a "prevent receipt" approach to thwarting an attack may involve a driver of the eye-tracking sensor or the operating system or both, being configured such that eye-tracking sensor output is not receivable by a process during those time periods where the operating system is operable not to notify the process of any detected keyboard output.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

APPENDIX A

Pseudo-Code Examples for Synchronous Communication

The pseudo-code examples below are designed to be a function in the sensor driver. The pseudo-code examples are based on the assumption that the wait_for_hardware_sensor_sample( ) will return a new sensor sample after waiting 1000/hardware_sensor_rate milliseconds. A number of different options are presented, each prefixed by a line of text indicating the specific settings for that option. The application calls get_sensor_sample, which returns with a sensor sample when one is available.

In the pseudo-code examples, a process that is exempt is referred to as a privileged application. The pseudo-code examples may be modified so that an approach is implemented only if the keyboard is displayed. To make this modification, add the following lines after the check for whether the application is privileged (i.e., after the "if( application.is_privileged(BACKGROUND_SENSOR_DATA))", and "break;" pair of lines):

```
if( is_keyboard_displayed( ) == false )
    /* The keyboard is not displayed, and therefore
    we can deliver a sensor event */
    break;
```

Example 1—no fake hardware sensor output, limited by being in background (i.e. prevent receipt of hardware sensor output while operating system is operable not to notify the process of detected touch events).

```
function get_sensor_sample( ) {
    do {
        sensor_event = wait_for_hardware_sensor_sample( );
        /* The time_delta is the number of milliseconds since the last sample
        was delivered to the application. */
        time_delta = current_time( ) - application.last_sample_time;
```

```
    if( time_delta < 1/application.sample_rate )
        /* Not enough time has elapsed for the sample rate requested
        * by the application. */
        continue;
    if( application.is_foreground( ) == true )
        /* Foreground applications are not limited */
        break;
    if( application.is_privileged( BACKGROUND_SENSOR_DATA ) )
        /* Privileged applications are not limited */
        break;
    if( time_delta < 1000/max_unprivileged_rate )
        /* Not enough time has elapsed for the sample rate allowed
        * by unprivileged background applications. */
        continue;
  } while( true );
  application.last_sample_time = current_time( );
  return sensor_event;
}
```

Example 2—fake hardware sensor output mixed with the occasional actual hardware sensor output, limited by being in background (i.e. while operating system is operable not to notify the process of detected touch events).

```
function get_sensor_sample( ) {
  do {
    sensor_event = wait_for_hardware_sensor_sample( );
    /* The time_delta is the number of milliseconds since the last sample
       was delivered to the application. */
    time_delta = current_time( ) - application.last_sample_time;
    if( time_delta < 1/application.sample_rate )
        /* Not enough time has elapsed for the sample rate requested
        * by the application. */
        continue;
    if( application.is_foreground( ) == true )
        /* Foreground applications are not limited */
        break;
    if( application.is_privileged( BACKGROUND_SENSOR_DATA ) )
        /* Privileged applications are not limited */
        break;
    time_delta = current_time( ) - application.last_real_sample_time;
    if( time_delta < 1000/max_unprivileged_rate ) {
        /* Not enough time has elapsed for the sample rate allowed
        * by unprivileged background applications. */
        application.last_sample_time = current_time( );
        return generate_fake_sample(sensor_event);
    }
  } while( true );
  application.last_sample_time = current_time( );
  application.last_real_sample_time = current_time( );
  return sensor_event;
}
```

Example 3—no fake hardware sensor output, limited by time of last touchscreen or keyboard event (i.e. timing via touch event window).

```
sensor_event_predelay = 75; /* This is configurable */
sensor_event_postdelay = 200; /* This is configurable */
function get_sensor_sample( ) {
  do {
    sensor_event = wait_for_hardware_sensor_sample( );
    /* Delay ALL sensor events by putting them in a FIFO queue. This
    * has the effect of making sure that each sensor event is delayed
    * by sensor_event_predelay milliseconds before it delivered to
    * any process */
    queue_depth = sensor_event_predelay*hardware_sensor_rate / 1000;
    if( sensor_queue.length < queue_depth ) {
        sensor_queue.queue( sensor_event );
        continue;
    } else {
        sensor_queue.queue( sensor_event );
        sensor_event = sensor_queue.dequeue( );
    }
    /* The time_delta is the number of milliseconds since the last sample
       was delivered to the application. */
    time_delta = current_time( ) - application.last_sample_time;
    if( time_delta < 1/application.sample_rate )
        /* Not enough time has elapsed for the sample rate requested
        * by the application. */
        continue;
    if( application.is_foreground( ) == true )
        /* Foreground applications are not limited */
        break;
    if( application.is_privileged( BACKGROUND_SENSOR_DATA ) )
        /* Privileged applications are not limited */
        break;
    if( current_time( ) - last_touchscreen_event( ) < sensor_event_predelay + sensor_event_postdelay )
        /* The current sensor sample arrived close enough to a touchscreen event */
        continue;
    if( current_time( ) - last_keyboard_event( ) < sensor_event_predelay + sensor_event_postdelay )
        /* The current sensor sample arrived close enough to a keyboard event */
        continue;
  } while( true );
  application.last_sample_time = current_time( );
  return sensor_event;
}
```

Example 4—fake hardware sensor output, limited by time of last touchscreen event (i.e. timing via touch event window)

```
sensor_event_predelay = 75; /* This is configurable */
sensor_event_postdelay = 200; /* This is configurable */
function get_sensor_sample( ) {
  do {
    sensor_event = wait_for_hardware_sensor_sample( );
    /* Delay ALL sensor events by putting them in a FIFO queue. This
    * has the effect of making sure that each sensor event is delayed
    * by sensor_event_predelay milliseconds before it delivered to
    * any process */
    queue_depth = sensor_event_predelay*hardware_sensor_rate / 1000;
    if( sensor_queue.length < queue_depth ) {
        sensor_queue.queue( sensor_event );
        continue;
    } else {
        sensor_queue.queue( sensor_event );
        sensor_event = sensor_queue.dequeue( );
    }
    /* The time_delta is the number of milliseconds since the last sample
       was delivered to the application. */
    time_delta = current_time( ) - application.last_sample_time;
    if( time_delta < 1/application.sample_rate )
        /* Not enough time has elapsed for the sample rate requested
        * by the application. */
        continue;
    if( application.is_foreground( ) == true )
        /* Foreground applications are not limited */
        break;
    if( application.is_privileged( BACKGROUND_SENSOR_DATA ) )
        /* Privileged applications are not limited */
        break;
    if( current_time( ) - last_touchscreen_event( ) < sensor_event_predelay +
sensor_event_postdelay ) {
        /* The current sensor sample arrived close enough to a touchscreen event */
        application.last_sample_time = current_time( );
        return generate_fake_sample(sensor_event);
    }
    if( current_time( ) - last_keyboard_event( ) < sensor_event_predelay +
sensor_event_postdelay ) {
        /* The current sensor sample arrived close enough to a keyboard event */
        application.last_sample_time = current_time( );
        return generate_fake_sample(sensor_event);
    }
  } while( true );
  application.last_sample_time = current_time( );
  return sensor_event;
}
```

Example 5—no fake hardware sensor output, limited by time of last touchscreen event (i.e. timing via touch event window), only delay sensor events to some processes (i.e. control sampling rate).

```
sensor_event_predelay = 75; /* This is configurable */
sensor_event_postdelay = 200; /* This is configurable */
function get_sensor_sample( ) {
  do {
    sensor_event = wait_for_hardware_sensor_sample( );
    /* The time_delta is the number of milliseconds since the last sample
       was delivered to the application. */
    time_delta = current_time( ) - application.last_sample_time;
    if( time_delta < 1/application.sample_rate )
        /* Not enough time has elapsed for the sample rate requested
        * by the application. */
        continue;
    if( application.is_foreground( ) == true ) {
        /* Foreground applications are not limited */
        sensor_queue.delete_all( );
        break;
    }
    if( application.is_privileged( BACKGROUND_SENSOR_DATA ) ) {
        /* Privileged applications are not limited */
        sensor_queue.delete_all( );
        break;
```

```
}
/* Delay the sensor event by putting it in a FIFO queue. This
 * has the effect of making sure that each sensor event is delayed
 * by sensor_event_predelay milliseconds before it delivered to
 * any process */
queue_depth = sensor_event_predelay*hardware_sensor_rate / 1000;
if( sensor_queue.length < queue_depth ) {
    sensor_queue.queue( sensor_event );
    continue;
} else {
    sensor_queue.queue( sensor_event );
    sensor_event = sensor_queue.dequeue( );
}
    if( current_time( ) - last_touchscreen_event( ) < sensor_event_predelay +
sensor_event_postdelay )
        /* The current sensor sample arrived close enough to a touchscreen event */
        continue;
    if( current_time( ) - last_keyboard_event( ) < sensor_event_predelay +
sensor_event_postdelay )
        /* The current sensor sample arrived close enough to a keyboard event */
        continue;
} while( true );
application.last_sample_time = current_time( );
return sensor_event;
}
```

Example 6—fake hardware sensor output, limited by time of last touchscreen event (i.e. timing via touch event window), only delay sensor events to some processes (i.e. control sampling rate).

```
sensor_event_predelay = 75; /* This is configurable */
sensor_event_postdelay = 200; /* This is configurable */
function get_sensor_sample( ) {
    do {
        sensor_event = wait_for_hardware_sensor_sample( );
        /* The time_delta is the number of milliseconds since the last sample
           was delivered to the application. */
        time_delta = current_time( ) - application.last_sample_time;
        if( time_delta < 1/application.sample_rate )
            /* Not enough time has elapsed for the sample rate requested
             * by the application. */
            continue;
        if( application.is_foreground( ) == true ) {
            /* Foreground applications are not limited */
            sensor_queue.delete_all( );
            break;
        }
        if( application.is_privileged( BACKGROUND_SENSOR_DATA ) ) {
            /* Privileged applications are not limited */
            sensor_queue.delete_all( );
            break;
        }
        /* Delay the sensor event by putting it in a FIFO queue. This
         * has the effect of making sure that each sensor event is delayed
         * by sensor_event_predelay milliseconds before it delivered to
         * any process */
        queue_depth = sensor_event_predelay*hardware_sensor_rate / 1000;
        if( sensor_queue.length < queue_depth ) {
            sensor_queue.queue( sensor_event );
            continue;
        } else {
            sensor_queue.queue( sensor_event );
            sensor_event = sensor_queue.dequeue( );
        }
        if( current_time( ) - last_touchscreen_event( ) < sensor_event_predelay +
sensor_event_postdelay ) {
            /* The current sensor sample arrived close enough to a touchscreen event */
            application.last_sample_time = current_time( );
            return generate_fake_sample(sensor_event);
        }
        if( current_time( ) - last_keyboard_event( ) < sensor_event_predelay +
sensor_event_postdelay ) {
            /* The current sensor sample arrived close enough to a keyboard event */
            application.last_sample_time = current_time( );
            return generate_fake_sample(sensor_event);
```

```
    }
} while( true );
application.last_sample_time = current_time( );
return sensor_event;
}
```

APPENDIX B

Pseudo-Code Examples for Asynchronous Communication

The pseudo-code examples below are designed to be a function in the sensor driver. The pseudo-code examples are based on the assumption that sensor events arrive on a fixed timeline at a rate of hardware_sensor_rate events per second (i.e., a new hardware sensor will arrive on schedule every 1/hardware_sensor_rate seconds). A number of different options are presented, each prefixed by a line of text indicating the specific settings for that option. All times are in milliseconds.

In the pseudo-code examples, a process that is exempt is referred to as a privileged application. The pseudo-code examples may be modified so that an approach is implemented only if the keyboard is displayed. To make this modification, add the following lines after the check for whether the application is privileged (i.e., after the "if( application.is_privileged(BACKGROUND_SENSOR_DATA))", and "goto deliver_sample;" pair of lines):
    if(is_keyboard_displayed( )==false)
      /* The keyboard is not displayed, and therefore we can deliver a sensor event */ break;

Example 1—no fake hardware sensor output, limited by being in background (i.e. prevent receipt of hardware sensor output while operating system is operable not to notify the process of detected touch events).

```
function receive_sensor_sample( sensor_event ) {
  for( i = 0; i < num_application_listeners( ); i++ ) {
    application = get_application_listener(i);
    /* The time_delta is the number of milliseconds since the last sample
       was delivered to the application. */
    time_delta = current_time( ) - application.last_sample_time;
    if( time_delta < 1000/application.sample_rate )
      /* Not enough time has elapsed for the sample rate requested
       * by the application. */
      continue;
    if( application.is_foreground( ) == true )
      /* Foreground applications are not limited */
      goto deliver_sample;
    if( application.is_privileged( BACKGROUND_SENSOR_DATA ) )
      /* Privileged applications are not limited */
      goto deliver_sample;
    if( time_delta < 1000/max_unprivileged_rate )
      /* Not enough time has elapsed for the sample rate allowed
       * by unprivileged background applications. */
      continue;
  deliver_sample:
    application.alert( sensor_event );
    application.last_sample_time = current_time( );
  }
}
```

Example 2—fake hardware sensor output mixed with the occasional actual hardware sensor output, limited by being in background (i.e. while operating system is operable not to notify the process of detected touch events).

```
function receive_sensor_sample( sensor_event ) {
  for( i = 0; i < num_application_listeners( ); i++ ) {
    application = get_application_listener(i);
    /* The time_delta is the number of milliseconds since the last
       sample was delivered to the application. */
    time_delta = current_time( ) - application.last_sample_time;
    if( time_delta < 1000/application.sample_rate )
      /* Not enough time has elapsed for the sample rate requested
       * by the application. */
      continue;
    if( application.is_foreground( ) == true )
      /* Foreground applications are not limited */
      goto deliver_sample;
    if( application.is_privileged( BACKGROUND_SENSOR_DATA ) )
      /* Privileged applications are not limited */
      goto deliver_sample;
    time_delta = current_time( ) - application.last_real_sample_time;
    if( time_delta < 1000/max_unprivileged_rate ) {
      /* Not enough time has elapsed for the sample rate allowed
       * by unprivileged background applications. */
      application.alert( generate_fake_sample(sensor_event) )
      application.last_sample_time = current_time( );
      continue;
    }
  deliver_sample:
    application.alert( sensor_event );
    application.last_sample_time = current_time( );
    application.last_real_sample_time = current_time( );
  }
}
```

Example 3—no fake hardware sensor output, limited by time of last touchscreen or keyboard event (i.e. timing via touch event window).

```
sensor_event_predelay = 75; /* This is configurable */
sensor_event_postdelay = 200; /* This is configurable */
function receive_sensor_sample( sensor_event ) {
  /* Delay ALL sensor events by putting them in a FIFO queue. This
   * has the effect of making sure that each sensor event is delayed
   * by sensor_event_predelay milliseconds before it delivered to
   * any process */
  queue_depth = sensor_event_predelay*hardware_sensor_rate / 1000;
  if( sensor_queue.length < queue_depth ) {
    sensor_queue.queue( sensor_event );
    return;
  } else {
    sensor_queue.queue( sensor_event );
```

```
    sensor_event = sensor_queue.dequeue( );
  }
  for( i = 0; i < num_application_listeners( ); i++ ) {
    application = get_application_listener(i);
    /* The time_delta is the number of milliseconds since the last sample
       was delivered to the application.
    */ time_delta = current_time( ) - application.last_sample_time;
    if( time_delta < 1000/application.sample_rate )
        /* Not enough time has elapsed for the sample rate requested
         * by the application. */
        continue;
    if( application.is_foreground( ) ==true )
        /* Foreground applications are not limited */
        goto deliver_sample;
    if( application.is_privileged( BACKGROUND_SENSOR_DATA ) )
        /* Privileged applications are not limited */
        goto deliver_sample;
    if( current_time( ) - last_touchscreen_event( ) < sensor_event_predelay +
sensor_event_postdelay )
        /* The current sensor sample arrived close enough to a touchscreen event */
        continue;
    if( current_time( ) - last_keyboard_event( ) < sensor_event_predelay +
sensor_event_postdelay )
        /* The current sensor sample arrived close enough to a keyboard event */
        continue;
  deliver_sample:
    application.alert( sensor_event );
    application.last_sample_time = current_time( );
  }
}
```

Example 4—fake hardware sensor output, limited by time of last touchscreen event (i.e. timing via touch event window) 30

```
sensor_event_predelay = 75; /* This is configurable */
sensor_event_postdelay = 200; /* This is configurable */
function receive_sensor_sample( sensor_event ) {
  /* Delay ALL sensor events by putting them in a FIFO queue. This
   * has the effect of making sure that each sensor event is delayed
   * by sensor_event_predelay milliseconds before it delivered to
   * any process */
  queue_depth = sensor_event_predelay*hardware_sensor_rate / 1000;
  if( sensor_queue.length < queue_depth ) {
    sensor_queue.queue( sensor_event );
    return;
  } else {
    sensor_queue.queue( sensor_event );
    sensor_event = sensor_queue.dequeue( );
  }
  for( i = 0; i < num_application_listeners( ); i++ ) {
    application = get_application_listener(i);
    /* The time_delta is the number of milliseconds since the last sample
       was delivered to the application. */
    time_delta = current_time( ) - application.last_sample_time;
    if( time_delta < 1000/application.sample_rate )
        /* Not enough time has elapsed for the sample rate requested
         * by the application. */
        continue;
    if( application.is_foreground( ) == true )
        /* Foreground applications are not limited */
        goto deliver_sample;
    if( application.is_privileged( BACKGROUND_SENSOR_DATA ) )
        /* Privileged applications are not limited */
        goto deliver_sample;
    if( current_time( ) - last_touchscreen_event( ) < sensor_event_predelay
+sensor_event_postdelay ) {
        /* The current sensor sample arrived close enough to a touchscreen event */
        application.alert( generate_fake_sample(sensor_event) )
        continue;
    }
```

```
    if( current_time( ) - last_keyboard_event( ) < sensor_event_predelay
+sensor_event_postdelay ) {
        /* The current sensor sample arrived close enough to a keyboard event */
        application.alert( generate_fake_sample(sensor_event) )
        continue;
    }
  deliver_sample:
    application.alert( sensor_event );
    application.last_sample_time = current_time( );
  }
}
```

Example 5—no fake hardware sensor output, limited by time of last touchscreen event (i.e. timing via touch event window), only delay sensor events to some processes (i.e. control sampling rate).

```
sensor_event_predelay = 75; /* This is configurable */
sensor_event_postdelay = 200; /* This is configurable */
function receive_sensor_sample( sensor_event ) {
  for( i = 0; i < num_application_listeners( ); i++ ) {
    application = get_application_listener(i);
    /* The time_delta is the number of milliseconds since the last sample
       was delivered to the application. */
    time_delta = current_time( ) - application.last_sample_time;
    if( time_delta < 1000/application.sample_rate )
        /* Not enough time has elapsed for the sample rate requested
         * by the application. */
        continue;
    if( application.is_foreground( ) == true )
        /* Foreground applications are not limited */
        goto deliver_sample;
    if( application.is_privileged( BACKGROUND_SENSOR_DATA ) )
        /* Privileged applications are not limited */
        goto deliver_sample;
    continue;
  deliver_sample:
    application.alert( sensor_event );
    application.last_sample_time = current_time( );
  }
  /* Delay the sensor event by putting it in a FIFO queue. This
   * has the effect of making sure that each sensor event is delayed
   * by sensor_event_predelay milliseconds before it delivered to
   * any process */
  queue_depth = sensor_event_predelay*hardware_sensor_rate / 1000;
  if( sensor_queue.length < queue_depth ) {
    sensor_queue.queue( sensor_event );
    return;
  } else {
    sensor_queue.queue( sensor_event );
    sensor_event = sensor_queue.dequeue( );
  }
  for( i = 0; i < num_application_listeners( ); i++ ) {
    application = get_application_listener(i);
    /* The time_delta is the number of milliseconds since the last sample
       was delivered to the application. */
    time_delta = current_time( ) - application.last_sample_time;
    if( time_delta < 1000/application.sample_rate )
        /* Not enough time has elapsed for the sample rate requested
         * by the application. */
        continue;
    if( application.is_foreground( ) ==true )
        /* Foreground applications are not limited - their event
         * was delivered in the previous for loop */
        continue;
    if( application.is_privileged( BACKGROUND_SENSOR_DATA ) )
        /* Privileged applications are not limited - their event
         * was delivered in the previous for loop */
        continue;
    if( current_time( ) - last_touchscreen_event( ) < sensor_event_predelay +
sensor_event_postdelay )
        /* The current sensor sample arrived close enough to a touchscreen event */
        continue;
    if( current_time( ) - last_keyboard_event( ) < sensor_event_predelay +
sensor_event_postdelay )
        /* The current sensor sample arrived close enough to a keyboard event */
```

-continued

```
        continue;
    application.alert( sensor_event );
    application.last_sample_time = current_time( );
    }
}
```

Example 6—fake hardware sensor output, limited by time of last touchscreen event (i.e. timing via touch event window), only delay sensor events to some processes (i.e. control sampling rate).

```
sensor_event_predelay = 75; /* This is configurable */
sensor_event_postdelay = 200; /* This is configurable */
function receive_sensor_sample( sensor_event ) {
    for( i = 0; i < num_application_listeners( ); i++ ) {
        application = get_application_listener(i);
        /* The time_delta is the number of milliseconds since the last sample
            was delivered to the application. */
        time_delta = current_time( ) - application.last_sample_time;
        if( time_delta < 1000/application.sample_rate )
            /* Not enough time has elapsed for the sample rate requested
            * by the application. */
            continue;
        if( application.is_foreground( ) ==true )
            /* Foreground applications are not limited */
            goto deliver_sample;
        if( application.is_privileged( BACKGROUND_SENSOR_DATA ) )
            /* Privileged applications are not limited */
            goto deliver_sample;
        continue;
    deliver_sample:
        application.alert( sensor_event );
        application.last_sample_time = current_time( );
    }
    /* Delay the sensor event by putting it in a FIFO queue. This
    * has the effect of making sure that each sensor event is delayed
    * by sensor_event_predelay milliseconds before it delivered to
    * any process */
    queue_depth = sensor_event_predelay*hardware_sensor_rate / 1000;
    if( sensor_queue.length < queue_depth ) {
        sensor_queue.queue( sensor_event );
        return;
    } else {
        sensor_queue.queue( sensor_event );
        sensor_event = sensor_queue.dequeue( );
    }
    for( i = 0; i < num_application_listeners( ); i++ ) {
        application = get_application_listener(i);
        /* The time_delta is the number of milliseconds since the last sample
            was delivered to the application. */
        time_delta = current_time( ) - application.last_sample_time;
        if( time_delta < 1000/application.sample_rate )
            /* Not enough time has elapsed for the sample rate requested
            * by the application. */
            continue;
        if( application.is_foreground( ) == true )
            /* Foreground applications are not limited - their event
            * was delivered in the previous for loop */
            continue;
        if( application.is_privileged( BACKGROUND_SENSOR_DATA ) )
            /* Privileged applications are not limited - their event
            * was delivered in the previous for loop */
            continue;
        if( current_time( ) - last_touchscreen_event( ) < sensor_event_predelay + sensor_event_postdelay ) {
            /* The current sensor sample arrived close enough to a touchscreen event */
            application.alert( generate_fake_sample(sensor_event) )
            continue;
        }
```

```
    if( current_time( ) - last_keyboard_event( ) < sensor_event_predelay +
sensor_event_postdelay ) {
        /* The current sensor sample arrived close enough to a keyboard event */
        application.alert( generate_fake_sample(sensor_event) )
        continue;
    }
    application.alert( sensor_event );
    application.last_sample_time = current_time( );
    }
}
```

What is claimed is:

1. A portable electronic device, comprising:
a processor;
a hardware sensor integrated in the portable electronic device, the hardware sensor operable to produce hardware sensor output indicative of orientation or motion or both of the portable electronic device within an environment;
a hardware user-input component integrated in the portable electronic device, the hardware user-input component having multiple elements operable to accept user input through touch;
a memory coupled to the processor, the memory storing:
an operating system;
a sensor driver for use by the operating system to interface with the hardware sensor;
a user-input driver for use by the operating system to interface with the hardware user-input component, the user-input driver and operating system jointly operable to detect touch events involving the elements; and
a software application,
wherein the software application is executable by the processor as a process that runs in foreground during times when the operating system is operable to notify the process of any detected touch events involving the elements and that runs in background during times when the operating system is operable not to notify the process of any detected touch events involving the elements, and
wherein, while the software application is executed by the processor as the process, the sensor driver or the operating system or both are configured to control what hardware sensor output produced by the hardware sensor, if any, is available to the process as follows: any of the hardware sensor output sampled using the sensor driver during time periods throughout which the process is running in the foreground and produced by the hardware sensor is available to the process, and any of the hardware sensor output sampled using the sensor driver during time periods throughout which the process is running in the background and produced by the hardware sensor is not available to the process.

2. The portable electronic device as recited in claim 1, wherein the hardware user-input component is a physical tactile keyboard, the elements are keys of the keyboard, and the touch events comprise key presses or key releases or both.

3. The portable electronic device as recited in claim 1, wherein the hardware user-input component is a touchscreen, the elements are touch sensors, and the touch events comprise presses or releases or both, the memory further storing a display driver for displaying images on the touchscreen.

4. The portable electronic device as recited in claim 3, wherein an image of a virtual keyboard is displayable on the touchscreen and the touch events comprise key presses or key releases or both or key swipes of keys in the virtual keyboard.

5. The portable electronic device as recited in claim 1, wherein the hardware sensor comprises an accelerometer.

6. The portable electronic device as recited in claim 1, wherein the hardware sensor comprises a gyroscope.

7. The portable electronic device as recited in claim 1, wherein the hardware sensor comprises a magnetometer.

8. The portable electronic device as recited in claim 1, wherein, while the software application is executed by the processor as the process, the sensor driver or the operating system or both are configured to make available to the process false hardware sensor output instead of any of the hardware sensor output that was sampled using the sensor driver during the time periods throughout which the process is running in the background and that was produced by the hardware sensor.

9. The portable electronic device as recited in claim 8, wherein the false hardware sensor output is generated from one or any combination of constants, fixed waveforms, and actual hardware sensor output produced by the hardware sensor integrated in the portable electronic device.

10. The portable electronic device as recited in claim 1, further comprising an additional hardware sensor integrated in the portable electronic device and operable to produce additional hardware sensor output indicative of orientation or motion or both of the portable electronic device within the environment, the memory further storing an additional sensor driver for use by the operating system to interface with the additional hardware sensor, wherein, while the software application is executed by the processor as the process, the additional sensor driver or the operating system or both are configured to control what hardware sensor output produced by the additional hardware sensor integrated in the portable electronic device, if any, is available to the process as follows: any of the additional hardware sensor output sampled using the additional sensor driver during the time periods throughout which the process is running in the foreground and produced by the additional hardware sensor available to the process, and any of the additional hardware sensor output sampled using the additional sensor driver during the time periods throughout which the process is running in the background and produced by the additional hardware sensor is not available to the process.

11. The portable electronic device as recited in claim 10, wherein the additional hardware sensor comprises an accelerometer.

12. The portable electronic device as recited in claim 10, wherein the additional hardware sensor comprises a gyroscope.

13. The portable electronic device as recited in claim 10, wherein the additional hardware sensor comprises a magnetometer.

14. The portable electronic device as recited in claim 1, wherein the memory is arranged to store another software application, wherein, while the other software application is executed by the processor as another process, the operating system is operable to register that the other software application has permission to receive samples of the hardware sensor output produced by the hardware sensor integrated in the portable electronic device, and wherein the sensor driver or the operating system or both are configured to control what hardware sensor output produced by the hardware sensor integrated in the portable electronic device, if any, is available to the other process as follows: any hardware sensor output produced by the hardware sensor integrated in the portable electronic device and sampled using the sensor driver is available to the other process regardless of when the hardware sensor output produced by the hardware sensor integrated in the portable electronic device is sampled using the sensor driver.

15. A portable electronic device, comprising:
a processor;
a hardware sensor integrated in the portable electronic device, the hardware sensor operable to produce hardware sensor output indicative of orientation or motion or both of the portable electronic device within an environment;
a hardware user-input component integrated in the portable electronic device, the hardware user-input component having multiple elements operable to accept user input through touch;
a memory coupled to the processor, the memory storing:
an operating system;
a sensor driver for use by the operating system to interface with the hardware sensor;
a user-input driver for use by the operating, system to interface with the hardware user-input component, the user-input driver and operating system jointly operable to detect touch events involving the elements; and
a software application,
wherein the software application is executable by the processor as a process that runs in foreground during times when the operating system is operable to notify the process of any detected touch events involving the elements and that runs in background during times when the operating system is operable not to notify the process of any detected touch events involving the elements, and
wherein, while the software application is executed by the processor as the process, the sensor driver or the operating system or both are configured to control what hardware sensor output produced by the hardware sensor integrated in the portable electronic device, if any, is available to the process as follows: any of the hardware sensor output sampled using the sensor driver during touch event windows that occur during time periods throughout which the process is running in the background and produced by the hardware sensor is not available to the process, and any of the hardware sensor output sampled using the sensor driver at all other times during execution of the software application and produced by the hardware sensor is available to the process, wherein a touch event window of the touch event windows starts prior to detection of a particular touch event involving one of the elements and ends sometime after detection of the particular touch event.

16. The portable electronic device as recited in claim 15, wherein the hardware user-input component is a physical tactile keyboard, the elements are keys of the keyboard, and the touch events comprise key presses or key releases or both.

17. The portable electronic device as recited in claim 15, wherein the hardware user-input component is a touchscreen, the elements are touch sensors, and the touch events comprise presses or releases or both, the memory further storing a display driver for displaying images on the touchscreen.

18. The portable electronic device as recited in claim 17, wherein an image of a virtual keyboard is displayable on the touchscreen and the touch events comprise key presses or key releases or both or key swipes of keys in the virtual keyboard.

19. The portable electronic device as recited in claim 15, wherein the hardware sensor comprises an accelerometer.

20. The portable electronic device as recited in claim 15, wherein the hardware sensor comprises a gyroscope.

21. The portable electronic device as recited in claim 15, wherein the hardware sensor comprises a magnetometer.

22. The portable electronic device as recited in claim 15, wherein, while the software application is executed by the processor as the process, the sensor driver or the operating system or both ace configured to make available to the process false hardware sensor output instead of any of the hardware sensor output that was sampled using the sensor driver during the touch event windows that occur during the time periods throughout which the process is running in the background and that was produced by the hardware sensor.

23. The portable electronic device as recited in claim 22, wherein the false hardware sensor output is generated from one or any combination of constants, fixed waveforms, and actual hardware sensor output produced by the hardware sensor integrated in the portable electronic device.

24. The portable electronic device as recited in claim 15, further comprising an additional hardware sensor integrated in the portable electronic device and operable to produce additional hardware sensor output indicative of orientation or motion or both of the portable electronic device within the environment, the memory further storing an additional sensor driver for use by the operating system to interface with the additional hardware sensor, wherein, while the software application is executed by the processor as the process, the additional sensor driver or the operating system or both are configured to control what hardware sensor output produced by the additional hardware sensor integrated in the portable electronic device, if any, is available to the process as follows: any of the additional hardware sensor output sampled using the additional sensor driver during the touch event windows that occur during the time periods throughout which the process is running in the background and produced by the additional hardware sensor is not available to the process, and any of the additional hardware sensor output sampled using the additional sensor driver at all other times during execution of the software are application and produced by the additional hardware sensor is available to the process.

25. The portable electronic device as recited in claim 24, wherein the additional hardware sensor comprises an accelerometer.

26. The portable electronic device as recited in claim 24, wherein the additional hardware sensor comprises a gyroscope.

27. The portable electronic device as recited in claim 24, wherein the additional hardware sensor comprises a magnetometer.

28. The portable electronic device as recited in claim 15, wherein the memory is arranged to store another software application, wherein the operating system is operable to register that the other software application has permission to receive samples of the hardware sensor output produced by the hardware sensor integrated in the portable electronic device, and wherein, while the other software application is executed by the processor as another process, the sensor driver or the operating system or both are configured to control what hardware sensor output produced by the hardware sensor integrated in the portable electronic device, if any, is available to the other process as follows: any hardware sensor output produced by the hardware sensor integrated in the portable electronic device and sampled using the sensor driver from the hardware sensor is available to the other process regardless of when the hardware sensor output produced by the hardware sensor integrated in the portable electronic device is sampled using the sensor driver.

29. A method performed in a portable electronic device, the method comprising:
controlling, by a sensor driver of the portable electronic device or an operating system of the portable electronic device or both, what hardware sensor output produced by a hardware sensor integrated in the portable electronic device, if any, is available to a process resulting from execution of a software application by a processor of the portable electronic device, as follows:
making any of the hardware sensor output sampled using the sensor driver during time periods throughout which the process is running in foreground and produced by the hardware sensor available to the process; and
making any of the hardware sensor output sampled using the sensor driver during time periods throughout which the process is running in background and produced by the hardware sensor not available to the process,
wherein the hardware sensor output is indicative of orientation or motion or both of the portable electronic device within an environment,
wherein the portable electronic device comprises a hardware user-input component integrated in the portable electronic device, the hardware user-input component having multiple elements operable to accept user input through touch, and
wherein the process runs in the foreground during times when the operating system of the portable electronic device is operable to notify the process of any detected touch events involving the elements, and the process runs in the background during times when the operating system is operable not to notify the process of any detected touch events involving the elements.

30. The method as recited in claim 29, further comprising:
making false hardware sensor output available to the process instead of any of the hardware sensor output that was sampled using the sensor driver during the time periods throughout which the process is running in the background and that was produced by the hardware sensor.

31. The method as recited in claim 30, further comprising:
generating the false hardware sensor output from one or any combination of constants, fixed waveforms, and actual hardware sensor output produced by the hardware sensor integrated in the portable electronic device.

32. A non-transitory computer-readable medium having stored thereon instructions which, when executed by a processor of a portable electronic device, cause the processor to perform operations comprising:
controlling, by a sensor driver of the portable electronic device or an operating system of the portable electronic device or both, what hardware sensor output produced by a hardware sensor integrated in the portable electronic device, if any, is available to a process resulting from execution of a software application by a processor of the portable electronic device, as follows:
making any of the hardware sensor output sampled using the sensor driver during time periods throughout which the process is running in foreground and produced by the hardware sensor available to the process; and
making any of the hardware sensor output sampled using the sensor driver during time periods throughout which the process is running in background and produced by the hardware sensor not available to the process,
wherein the hardware sensor output is indicative of orientation or motion or both of the portable electronic device within an environment,
wherein the portable electronic device comprises a hardware user-input component integrated in the portable electronic device, the hardware user-input component having multiple elements operable to accept user input through touch, and
wherein the process runs in the foreground during times when the operating system of the portable electronic device is operable to notify the process of any detected touch events involving the elements, and the process runs in the background during times when the operating system is operable not to notify the process of any detected touch events involving the elements.

\* \* \* \* \*